United States Patent
Cobb

(10) Patent No.: US 12,178,278 B2
(45) Date of Patent: Dec. 31, 2024

(54) SOLE ASSEMBLY AND RELATED METHOD OF MANUFACTURE

(71) Applicant: Wolverine Outdoors, Inc., Rockford, MI (US)

(72) Inventor: Ian M. Cobb, Rockford, MI (US)

(73) Assignee: Wolverine Outdoors, Inc., Rockford, MI (US)

( * ) Notice: Subject to any disclaimer, the term of this patent is extended or adjusted under 35 U.S.C. 154(b) by 0 days.

(21) Appl. No.: 18/139,773

(22) Filed: Apr. 26, 2023

(65) Prior Publication Data

US 2024/0358111 A1 Oct. 31, 2024

(51) Int. Cl.
B29D 35/06 (2010.01)
A43B 13/04 (2006.01)
A43B 13/12 (2006.01)
B29D 35/14 (2010.01)

(52) U.S. Cl.
CPC ............ *A43B 13/125* (2013.01); *A43B 13/04* (2013.01); *B29D 35/061* (2013.01); *B29D 35/142* (2013.01)

(58) Field of Classification Search
CPC .... A43B 13/125; A43B 13/04; B29D 35/061; B29D 35/142
See application file for complete search history.

(56) References Cited

U.S. PATENT DOCUMENTS

| | | |
|---|---|---|
| 10,081,716 B2 | 9/2018 | Chang et al. |
| 10,232,533 B2 | 3/2019 | Baghdadi |
| 10,850,434 B2 | 12/2020 | Darland et al. |
| 10,899,901 B2 | 1/2021 | Chang et al. |
| 10,932,522 B2 | 3/2021 | Kurcinka et al. |
| 10,982,067 B2 | 4/2021 | Baghdadi et al. |
| 11,034,813 B2 | 6/2021 | Baghdadi |
| 2018/0273715 A1 | 9/2018 | Luo et al. |
| 2018/0273718 A1 | 9/2018 | Luo et al. |
| 2020/0087476 A1 | 3/2020 | Chang et al. |
| 2020/0113281 A1 | 4/2020 | Dirsa et al. |
| 2020/0281314 A1 | 9/2020 | Stockbridge et al. |
| 2021/0078275 A1 | 3/2021 | Baghdadi et al. |
| 2021/0078276 A1 | 3/2021 | Baghdadi et al. |
| 2021/0079186 A1 | 3/2021 | Baghdadi et al. |
| 2021/0079187 A1 | 3/2021 | Baghdadi |
| 2021/0079188 A1 | 3/2021 | Baghdadi et al. |
| 2021/0086412 A1 | 3/2021 | Darland et al. |
| 2021/0114324 A1 | 4/2021 | Liu et al. |
| 2021/0198444 A1 | 7/2021 | Baghdadi et al. |
| 2021/0238377 A1 | 8/2021 | Baghdadi |
| 2021/0276293 A1 | 9/2021 | Baghdadi et al. |
| 2021/0276294 A1 | 9/2021 | Baghdadi et al. |
| 2021/0354345 A1 | 11/2021 | Archer et al. |
| 2021/0354349 A1 | 11/2021 | Archer et al. |

*Primary Examiner* — Monica A Huson
(74) *Attorney, Agent, or Firm* — Warner Norcross + Judd LLP

(57) ABSTRACT

A method of forming a sole assembly for footwear construction comprises providing a first polymeric composition having a first density and a second polymeric composition having a second density in a mold to form a pre-expanded midsole. The pre-expanded midsole is expanded using a supercritical fluid to form a midsole. The midsole includes an exterior portion having a third density and an interior portion having a fourth density, which is different than the third density. The midsole defines a first surface and a second surface opposite the first surface. An outsole is joined with the second surface of the midsole.

9 Claims, 12 Drawing Sheets

100

Providing in a mold a first polymeric composition having a first density and a second polymeric composition having a second density to form a pre-expanded midsole
102

↓

Expand the pre-expanded midsole using a supercritical fluid to form a midsole, the midsole defining a first surface and second surface opposite the first surface and including an exterior portion having a third density and an interior portion having a fourth density different than the third density
104

↓

Join an outsole with the second surface of the midsole, the outsole including a ground contacting surface
106

FIG. 1

SOLE ASSEMBLY AND RELATED METHOD OF MANUFACTURE

BACKGROUND OF THE INVENTION

The present invention relates to a method of forming a sole assembly, and more particularly to a method of forming a midsole comprising different portions having different densities using a supercritical fluid. A footwear construction including the midsole provides improved energy return and comfort to a wearer.

There is a variety of diverse types of sole assemblies used in conjunction with footwear. Many sole assemblies include a midsole constructed from foam and an underlying outsole, usually constructed from rubber for durability. The foam provides underfoot cushion, and the outsole can include lugs for traction and wear resistance. Some sole assemblies also can include a footbed above the midsole to enhance comfort while the footwear is worn by a wearer.

A variety of different sole assemblies have been proposed, but a typical sole assembly is specialized, e.g., for running, for cross-training, or for hiking. However, specialized sole assemblies can work well for a particular application such as running, but cannot provide comfort, support, and the desired performance for another application such as hiking. For example, a conventional sole assembly designed for running can be overly rigid, making it less adaptable to underfoot terrain. Further, the same conventional sole assembly designed for running cannot perform optimally under certain environmental conditions. For example, the conventional sole assembly can exhibit reduced energy return at higher temperatures, reduced comfort at lower temperatures, etc.

Midsoles typically comprise a polymer foam. Common polymer foams include: ethylene vinyl acetate foam, low-density polyethylene foam, nitrile rubber foam, polychloroprene foam, polyimide foam, polypropylene foam, polystyrene foam, polyurethane foam, polyethylene foam, polyvinyl chloride foam, silicone foam, and microcellular foam. Polymer foams can be flexible or rigid, which depends on whether their glass transition temperature ($T_g$) is below or above room temperature. The $T_g$ depends upon chemical composition, degree of crystallinity, and degree of cross-linking. Polymer foams can be described as either closed cell or open cell foams. In closed cell foams, the foam cells are isolated from each other, and cavities are surrounded by complete cell walls. In open cell foams, cells are connected to each other. Cell geometry, size, and shape affect the foam properties.

Traditional foaming processes typically include molding and foaming polymer compositions with chemical or physical blowing agents. Chemical blowing agents usually are reactive species that decompose to produce gas during the foaming process. Physical blowing agents are usually inert gases or low boiling liquids which volatilize during the foaming process. Traditional foaming processes can be limited by polymers, blowing agents and the molding process used to form the midsole.

However, the use of supercritical fluid has several advantages. Typically, supercritical fluid foaming processes involve preparing a three-dimensional unfoamed article, placing the unfoamed article into a pressurized "tank," and introducing a supercritical fluid into the tank. The unfoamed article absorbs the supercritical fluid while in the tank, due to elevated temperature and/or pressure therein. Once pressure is removed, the article, e.g., a midsole, is foamed to an expands to product size. The supercritical fluid foaming process can yield a foamed article with consistent cell structure and improved physical properties over foamed articles formed with traditional foaming processes. For example, a supercritical fluid foamed article often has improved mechanical properties, such as impact strength and toughness, and can exhibit improved surface appearance over foamed articles formed with traditional foaming processes. Further, the supercritical fluid foamed products can provide for both savings on material and weight reduction.

Nonetheless, the use of supercritical fluid to form midsoles has limitations that make it difficult to form a midsole comprising two material types to provide improved energy return and comfort to a wearer over a wide range of activities in a various. For example, during the supercritical fluid foaming process it is difficult to control supercritical fluid expansion and attempts to foam a midsole comprising more than one material types can yield inconsistent curing and non-uniform expansion of cells. Inconsistent curing and non-uniform expansion of cells can result in a midsole having varying degrees of hardness, density, resilience, and cohesiveness.

Accordingly, there remains room for improvement in the construction of sole assemblies including supercritical fluid foamed articles and there remains a need for footwear that provides improved energy return and comfort to a wearer in different activities and various conditions.

SUMMARY OF THE INVENTION

A method of forming a sole assembly for footwear construction is disclosed. The method can include providing a first polymeric composition having a first density and a second polymeric composition having a second density and forming a pre-expanded midsole. The pre-expanded midsole can be expanded using a supercritical fluid to form a midsole. The midsole can include different densities in different portions thereof to provide particular cushion, energy return and other characteristics to a sole assembly with which the midsole is associated.

In one embodiment, the method can include providing in a mold a first polymeric composition having a first density and a second polymeric composition having a second density into a mold to form a pre-expanded midsole. The pre-expanded midsole is then expanded using a supercritical fluid to form a midsole. The midsole defines a first surface and a second surface opposite the first surface and includes an exterior portion having a third density and an interior portion having a fourth density different than the third density. An outsole is joined with the second surface of the midsole.

In a further embodiment, the method can comprise the step of curing the pre-expanded midsole subsequent to the step of providing in a mold and prior to the step of expanding. The step of curing can be conducted at a temperature of from 150 to 225° C. for a duration of from 200 to 800 seconds.

In another embodiment, the step of expanding can be conducted at a temperature of less than 150° C. for a duration of less than 2.5 hours.

In still another embodiment, the first polymeric composition can comprise ethylene vinyl acetate and titanium dioxide and the second polymeric composition can comprise ethylene vinyl acetate and a colorant. The second polymeric composition can also comprise an olefin block copolymer and/or a polyolefin elastomer.

In yet another embodiment, the exterior portion can be translucent and can comprise a cured, foamed reaction product of the first polymeric composition and the interior portion can be colored and can comprise a cured, foamed reaction product of the second polymeric composition. In such embodiments, at least one of the second surface and a sidewall of the midsole can exhibit a color gradient resulting from a varying thickness of the exterior portion and the interior portion adjacent thereto.

In even another embodiment, the outsole can include an upper surface and a ground contacting surface. The step of joining the outsole can include compression molding the upper surface of the outsole to the second surface of the midsole.

In still a further embodiment, the step of expanding the pre-expanded midsole with the supercritical fluid can comprise injecting the first polymeric composition with a first amount of the supercritical fluid and the second polymeric composition with a second amount of the supercritical fluid thereby forming the interior portion having an average cell size that is less than, equal to, and/or greater than an average cell size of the exterior portion.

In yet a further embodiment, the step of expanding the pre-expanded midsole with the supercritical fluid can comprise injecting the first polymeric composition with a first amount of the supercritical fluid and the second polymeric composition with a second amount of the supercritical fluid thereby creating different densities of each of the first and second polymeric compositions, in different portions or regions of the midsole after the introduction of the supercritical fluid.

In still yet a further embodiment, the outsole can comprise a plurality of segments adjacent the midsole, and two or more of the plurality of segments are at least partially isolated from each other with portions of the midsole therebetween.

In another embodiment, a sole assembly is provided. The sole assembly can comprise a midsole and an outsole. The midsole can comprise a cured product of a pre-expanded midsole. The pre-expanded midsole can include a first polymeric composition having a first density and a second polymeric composition having a second density and is expanded in the presence of a supercritical fluid.

In still another embodiment, the midsole, which was foamed with a supercritical fluid, can have an exterior portion and an interior portion. The exterior portion can comprise a cured, expanded reaction product of the first polymeric composition. The interior portion can comprise a cured, expanded reaction product of the second polymeric composition.

In yet another embodiment, the midsole can have a first surface at least partially defined by the interior portion and bounded at least partially by a sidewall wall comprising the exterior portion. The midsole can have a second surface opposite the first surface and defined by the exterior portion.

In even another embodiment, the midsole wall can define a perimeter surface that extends around a perimeter of the sole assembly. The perimeter surface can define a plurality of medial notches and a plurality of corresponding lateral notches. A plurality of medial stanchions can be disposed between the plurality of medial notches and a plurality of corresponding lateral stanchions can be disposed between the plurality of corresponding of lateral notches.

In a further embodiment, the outsole can define an upper surface and a ground-contacting surface. The upper surface of the outsole can be adjacent the second surface of the midsole. The outsole can comprise a plurality of segments at least partially separated from one another with a plurality of channels defined by the exterior portion. Each of the plurality of channels can extend in a lateral direction between each of the plurality of medial notches and each of the plurality of corresponding lateral notches. Each of the plurality of segments extends in a lateral direction between each of the plurality of medial stanchions and each of the plurality of corresponding lateral stanchions.

In yet a further embodiment, the exterior portion of the sole assembly can have a third density and comprise cured, expanded reaction product of a first polymeric composition comprising ethylene vinyl acetate and a first colorant, and the interior portion of the sole assembly can have a fourth density and comprise cured, expanded reaction product of the second polymeric composition comprising ethylene vinyl acetate and a second colorant, which is different than the first colorant. In this embodiment, the third and fourth densities are different as a result of expanding the first and second polymeric compositions in the presence of the supercritical fluid.

In still a further embodiment, a footwear construction comprising a midsole defining a foot-receiving cavity and an outsole is provided. The midsole can comprise a cured product of a pre-expanded midsole expanded in the presence of a supercritical fluid. The pre-expanded midsole can comprise a first polymeric composition having a first density and a second polymeric composition having a second density. The midsole can include an exterior portion configured to provide structure and energy return and an interior portion configured to provide comfort and support. The exterior portion can include a third density and can comprise a cured, expanded reaction product of the first polymeric composition. The interior portion can include a fourth density, which is different than the third density, and can comprise a cured, expanded reaction product of the second polymeric composition.

In yet a further embodiment, the midsole can include a first surface and a second surface. The first surface can be at least partially defined by the interior portion and can be at least partially bounded by a midsole wall comprising the exterior portion. The midsole wall can extend around a perimeter of the first surface and can define the foot-receiving cavity. The second surface can be opposite the first surface and can be defined by the exterior portion.

In even a further embodiment, the footwear construction can include the outsole. The outsole can comprise a plurality of segments and can define an upper surface and a ground-contacting surface. The upper surface of the outsole can be adjacent the second surface of the midsole, and the ground-contacting surface can be adapted for providing traction on a variety of terrains. Two or more of the plurality of segments of the outsole can be at least partially separated from each other with portions of the midsole therebetween to create a footwear construction adapted for providing comfort and energy return on a variety of terrains at a variety of temperatures.

In another embodiment, the plurality of segments can extend in a lateral direction between a medial periphery of the footwear construction and a lateral periphery of the footwear construction. In this embodiment, the plurality of segments can be at least partially separated from one another with a plurality of channels defined by the exterior portion. In some such embodiments, at least a portion of the plurality of channels (for example the plurality of channels in a midfoot region of the footwear construction) can increase in depth as the plurality of channels extend between a medial periphery of the footwear construction and a lateral periphery of the footwear construction. In some such embodiments, the exterior portion can be translucent or transparent, and the interior portion can be opaque and/or colored. As such, the plurality of channels can exhibit a color gradient extending from the medial periphery towards the lateral periphery of the footwear construction, or generally inwardly from the exterior most portions of the midsole. The color gradient can result from a varying thickness of the exterior portion and the interior portion adjacent thereto.

In yet another embodiment, the exterior portion can be translucent and/or transparent, and the interior portion can be colored or opaque. Visible portions of the midsole wall and the second surface can exhibit the color and/or opacity to varying degrees depending on a thickness of the exterior portion with the interior portion adjacent thereto.

In yet even another embodiment, the midsole wall can comprise the exterior portion and can define a perimeter surface that extends around a perimeter of the footwear construction. The perimeter surface can define a plurality of medial notches on a medial periphery and a plurality of corresponding and/or offset lateral notches on a lateral periphery. Each of the plurality of segments of the outsole can be at least partially separated from one another with a plurality of channels defined by the second surface and each of the plurality of channels can at least partially extend between each of the plurality of medial notches and each of the plurality of corresponding lateral notches.

In a further embodiment, a plurality of medial stanchions can be disposed between respective medial notches and a plurality of corresponding lateral stanchions can be disposed between respective lateral notches. In this embodiment, each of the plurality of medial stanchions can have a width $W_M$ and each of the plurality of corresponding lateral stanchions can have a width $W_L$. In some such embodiments, the width $W_M$ of each of the plurality of medial stanchions can be greater than the width $W_L$ of each of the plurality of the corresponding lateral stanchions in a midfoot region of the footwear construction.

In a still further embodiment, the rust polymeric composition can consist essentially of ethylene vinyl acetate and a first colorant, and the second polymeric composition can consist essentially of ethylene vinyl acetate and a second colorant. In this embodiment, the second colorant can be different than the first colorant. Also in this embodiment, the third and fourth densities are different as a result of expanding the first and second polymeric compositions in the presence of the supercritical fluid.

The present method and footwear sole assembly can provide benefits in comfort, energy return and aesthetics that previously have not been achievable. The current method allows for formation of the midsole comprising the two portions having different compositions and densities with a supercritical fluid foaming process. In turn, the footwear construction including the midsole and the outsole comprising a plurality of segments at least partially separated from each other with portions of the midsole therebetween provides comfort and energy return on a variety of terrains at a variety of temperatures, as well as unique aesthetic attributes.

These and other objects, advantages, and features of the invention will be more fully understood and appreciated by reference to the description of the current embodiment and the drawings.

Before the embodiments of the invention am explained in detail, it is to be understood that the invention is not limited to the details of construction and the arrangement of the components set forth in the following description or illustrated in the drawings. The invention can be implemented in various other embodiments and of being practiced or being conducted in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration can be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIG. 1 is a flow chart describing a method of forming a sole assembly including a midsole comprising an exterior portion an interior portion with different densities, the method includes the step of expanding a pre-expanded sole using a supercritical fluid to form the midsole;

FIG. 9A is a cross-sectional view of a portion of the sole assembly of FIG. 9 along line 9A-9A illustrating a channel depth at line 9A-9A.

FIG. 9B is a cross-sectional view of a portion of the sole assembly of FIG. 9 along line 9B-9B illustrating a channel depth at line 9B-9B.

FIG. 9C is a cross-sectional view of a portion of the sole assembly of FIG. 9 along line 9C-9C illustrating a channel depth at line 9C-9C.

DETAILED DESCRIPTION OF THE CURRENT EMBODIMENTS

Figure 2:
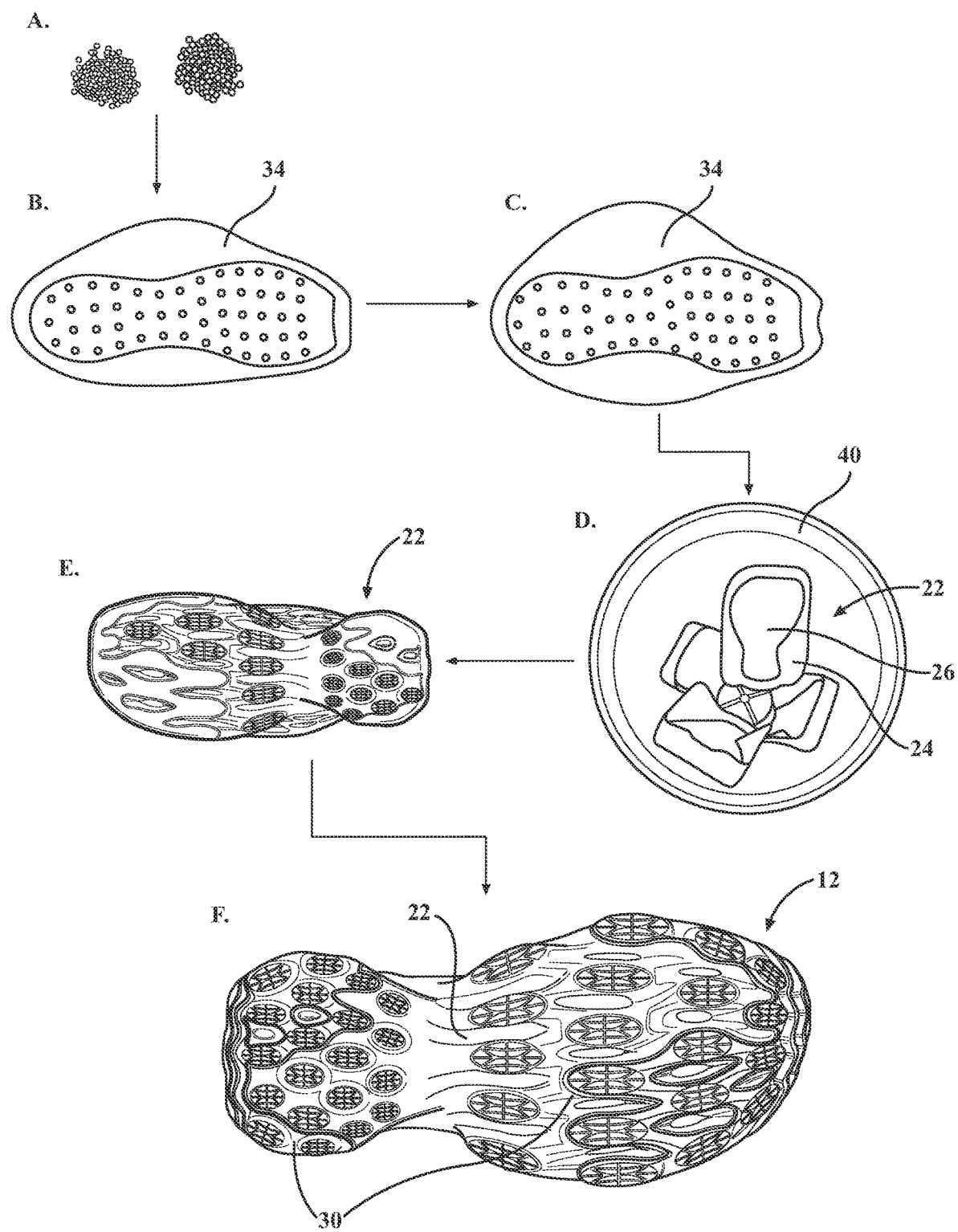
FIG. 2 is a schematic diagram illustrating various components of an exemplary sole assembly as is formed stepwise.

A current embodiment of a method of forming a sole assembly 12 including a midsole 22 comprising an exterior portion 24 an interior portion 26 with different densities using a supercritical fluid is illustrated in FIGS. 1-8 and designated 100. In turn, a current embodiment of a footwear construction including the sole assembly 12, 212 which can be formed with the method 100, is illustrated in FIGS. 9-14 and designated 210.

Although the current embodiments of the method 100 and the footwear construction are illustrated in the context of a trail shoe, the sole assembly 12 thereof can be incorporated into any type or style of footwear, including performance shoes, running shoes, trail boots and boots, work boots, all-terrain shoes, hiking shoes, athletic shoes, running shoes, sneakers, conventional tennis shoes, walking shoes, multi-sport footwear, sandals, casual shoes, dress shoes or any other type of footwear or footwear components. It also should be noted that directional terms, such as "vertical," "horizontal," "top," "bottom," "upper," "lower," "inner," "inwardly," "outer" and "outwardly," an used to assist in describing the invention based on the orientation of the embodiments shown in the illustrations. Further, the terms "medial," "lateral" and "longitudinal" are used in the manner commonly used in connection with footwear. For example, when used in referring to a side of the shoe, the term "medial" refers to the inward side (that is, the side facing the other the footwear construction) and "lateral" refers to the outward side. When used in referring to a direction, the term "longitudinal direction" refers to a direction generally extending along the length of the footwear construction between toe and heel, and the term "lateral direction" refers to a direction extending across the width of the footwear construction between the medial and lateral sides of the footwear construction.

The use of directional terms should not be interpreted to limit the invention to any specific orientation. Further, as used herein, the term "midfoot region" (or arch) refers generally to the portion of the footwear construction or the sole assembly 12 corresponding to the arch or midfoot of the wearer's foot; the term "forefoot region" (or forefoot) refers generally to the portion of the footwear construction forward of the arch region corresponding to the forefoot (for example, including the ball and the toes) of a wearer's foot; the term "heel region" (or heel) refers generally to that portion of the footwear construction rearward of the arch region corresponding to the heel of the wearer's foot; and the term "periphery" refers generally to the peripheral edge extending around the side exterior of the footwear construction. The forefoot region 14, arch or midfoot region 16, the heel region 18, and the periphery 20 are identified in FIGS. 9 and 10; however, delineation of these regions can vary depending upon the configuration of the sole assembly 12 and the footwear construction.

The term footwear construction as used herein refers to the assembled shoe. The term sole assembly 12 collectively refers to the midsole 22 defining a foot-receiving cavity 28 and an outsole 30 defining a ground-contacting surface 32. The midsole 22 has the exterior portion 24 configured to provide structure and energy return and the interior portion 26 configured to provide comfort and support. The outsole 30 includes the ground-contacting surface 32 adapted for providing traction on a variety of terrains. More or fewer elements of the sole assembly 12 can be included in some embodiments. The components of the sole assembly 12 can individually and/or collectively provide footwear construction with a number of attributes, such as energy return, roll over, support, rigidity, flexibility, stability, cushioning, comfort, reduced weight, and/or other attributes. Regardless of which components are present, the sole assembly 12 can form a bottommost portion of the footwear construction. The sole assembly 12 can include a perimeter, a side-to-side width, a heel-to-toe longitudinal length and a longitudinal axis, and a lateral axis, which can be shared with the footwear construction, the sole assembly 12, the midsole 22, and/or the outsole 30.

Referring now to FIG. 1, the method 100 of forming the sole assembly 12 including the midsole 22 comprising the exterior portion 24 and the interior portion 26 with different densities using a supercritical fluid is illustrated. The method includes the step of providing a first polymeric composition having a first density and a second polymeric composition having a second density in a mold to form a pre-expanded midsole 34 (102). The pre-expanded midsole 34 is then expanded using a supercritical fluid to form the midsole 22 (104). The midsole 22 defines a first surface 36 and a second surface 38 opposite the first surface 36 and includes the exterior portion 24 having a third density and an interior portion 26 having a fourth density different than the third density. Finally, the outsole 30 is joined with the second surface 38 of the midsole 22, the outsole 30 including the ground-contacting surface 32 (106).

Referring now to FIG. 2, a schematic diagram illustrating various components of the sole assembly 12 an illustrated, step wise, in accordance with one embodiment of the method. The first image (A) illustrated is an example of the first polymeric composition in pelletized form having a translucent appearance and a sample of the second polymeric composition in pelletized form and colored. The first and the second polymeric compositions are typically compounded, e.g., on a twin screw extruder and then pelletized, e.g., with an underwater pelletizing process. In some embodiments, the pellets an aged, or annealed, for a period of from 10 to 38 hours, or from 18 to 28 hours prior to the step of providing in a mold the first and the second polymeric compositions into the mold to form the pre-expanded midsole 34.

The first and the second polymeric compositions comprise a plurality of components such as polymeric binder, filler, and additives. The first and the second polymeric compositions are typically different but can comprise common components. For example, the first and second composition can comprise a blend of polymeric binders including ethylene vinyl acetate.

The first and second compositions include a polymeric binder. The polymeric binder includes one or more different polymers. In a typical embodiment, the polymeric binder includes ethylene-vinyl acetate (EVA), a copolymer of ethylene and vinyl acetate. In some embodiments, the weight percent of vinyl acetate is from about 10 to 40 wt. %, with the remainder wt. % being ethylene. EVA is an elastomeric polymer that produces materials which are "rubber-like" in softness and flexibility.

The polymeric binder can comprise polyolefins instead of or in combination with EVA. Polyolefins are formed by the polymerization of olefin monomer units such as ethylene, butene, octene, hexane, or propylene. Commercial polyolefins can be produced by catalyzed polymerization such as Ziegler-Natta catalyst or metallocene catalyst. Common thermoplastic polyolefins include polyethylene, polypropylene, polymethyl pentene, and polybutene-1. Polyolefin elastomers ("POEs") can be formed by the polymerization of ethylene in conjunction with a comonomer such as butene or octene. Common POEs include EVA, polyisobutylene, ethylene propylene rubber, ethylene propylene diene monomer rubber. Polyolefin elastomers are random copolymers of ethylene and another alpha-olefin, such as butene or octene. The metallocene catalyst selectively polymerizes the ethylene and comonomer sequences and increasing the comonomer content will produce polymers with higher elasticity as the comonomer incorporation disrupts the polyethylene crystallinity. Furthermore, the molecular weight of the copolymer will help determine its processing characteristics and end-use performance properties with higher molecular weights providing enhanced polymer toughness. Olefin block copolymers (OBC) are POEs composed of alternating soft and hard blocks. The soft blocks deliver flexibility, and the hard blocks deliver heat resistance.

The polymeric binder can also include a thermoplastic elastomer instead of or in combination with EVA. Thermoplastic elastomers ("TPEs") are soft and flexible like thermoset rubber and are melt-processable and re-processable like thermoplastics. TPEs are polymers, polymer blends, or compounds, which above their melt temperatures exhibit thermoplastic character. Generic classes of commercial TPEs include: thermoplastic vulcanizers, styrene block copolymers, polyolefin blends, elastomeric alloys, thermoplastic polyurethane, thermoplastic copolyester, and thermoplastic polyamide.

In many embodiments, the first and the second polymeric compositions include a curative or a crosslinker. EVA is typically crosslinked via a radical reaction, using an organic peroxide or peroxycarboxylic acid as radical initiator. Common peroxides such as dicumyl peroxide or di-t-butyl peroxide are used to cross-link polyolefin thermoplastic and thermoplastic elastomers. Dicumyl peroxide is commonly used to crosslink low density polyethene, ethylene propylene rubber, ethylene-prylene-diene rubber, and EVA, ethylene-methyl acrylate, ethylene-ethyl acrylate, and ethylene-butyl acrylate.

The polymeric binder can also include one or more additives. Some non-limiting examples of additives include accelerators, plasticizers, flame retardants, antioxidants, acid scavengers, light and heat stabilizers, lubricants, pigments, antistatic agents, slip compounds and thermal stabilizers. The polymeric binder can also include one or more colorants. Dyes and colorant can be used for aesthetic purposes or to alter physical properties of the product, such as to repel light. Simply stated, the colorant is a compound or composition that is added to the first and or second polymeric composition to impart a color such as black, white, red, green, yellow, blue, pink, gray, brown, orange, or purple to the interior and exterior portions formed therefrom.

In some embodiments, the first polymeric composition comprises EVA and titanium dioxide. In some embodiments, the first polymeric composition comprises EVA and titanium dioxide in an amount sufficient to make the first polymeric composition translucent. In turn, the exterior portion 24, which is formed from the first polymeric composition, is also translucent.

In some embodiments, the second polymeric composition comprises EVA and/or an olefinic copolymer, which is less dense than the EVA. For example, the second polymeric composition can comprise a blend of EVA and olefinic block copolymer. In another embodiment, the second polymeric composition can comprise a blend of EVA and polyolefin elastomer such as a random copolymer of ethylene-butene or a random copolymer of ethylene-octene.

It should be appreciated that many different embodiments of the first and the second polymeric compositions are contemplated herein. For example, the first polymeric composition can comprise different blends of components (such as those described above), have different densities, and have different coloring/levels of translucency. Likewise, the second polymeric composition can comprise different blends of components (such as those described above), having different softening points, having different densities, having different color, etc. In one embodiment of method the first polymeric composition has a lower softening point than the second polymeric composition, this facilitates the formation of the plurality of channels in the second surface 38, and the notches and stanchions in the midsole wall 42, all which can present a color gradient, as is explained in detail below. Of course, in some embodiments the first and the second polymeric compositions comprise substantially similar components. As an example, in one embodiment the rust polymeric composition comprises EVA, additives, and a first colorant (e.g., titanium dioxide or zinc oxide) and the second polymeric composition comprises a second colorant that is different than the first colorant. In this example, the rust and the second polymeric compositions comprise the same components in the same amount but for the rut and second colorants.

Once the first polymeric composition and the second polymeric composition are compounded, pelletized, and optionally annealed, the rut and second polymeric compositions are processed in a mold to form the pre-expanded midsole 34. Plastic molding processes include injection molding and compression molding, both of which are well known in the art. Referring again to FIG. 2, the second image (B) illustrated is an embodiment of the pre-expanded midsole 34 formed via molding the first polymeric composition and the second polymeric composition.

In one embodiment, the first and second polymeric compositions are injection molded to form the pre-expanded midsole 34. In this embodiment, the injection molding process can accommodate polymeric compositions having melt indexes from 2 to 45 g/10 min (190° C., 2.16 kg). From a processing perspective, injection pressures of from 35 to 100 MP mold temperatures of up to 230° C. (e.g., from 150 to 200° C.), and mold coolant temperatures of from 15 to 40° C. can be employed. The duration of the injection molding process can be process can be from 200 to 600 sec. This injection molding process can accommodate the use of a variety of different first and second polymeric compositions, e.g., including different components, having different densities, and/or having different/assorted colors. The particles can be injected at different intervals which can correspond to different portions of the polymeric composition.

The pre-expanded midsole 34 can be molded to a shape that has proportionately smaller dimensions to a final component of the midsole 22 or the sole assembly 12. For embodiment, the pre-expanded midsole 34 can be molded to have the same shape, but smaller dimensions than the midsole 22, which is expanded. The midsole 22 can have portions of varying thickness. Typically, the forefoot region 14 of the midsole 22 is less thick than the heel region 18. Of course, in a typical embodiment the pre-expanded midsole 34 and the midsole 22 are formed so that the exterior and interior portions 24, 26 are large enough/have appropriate dimensions to accommodate the formation of the plurality of channels in the second surface 38, and the notches and stanchions in the midsole wall 42. Once the pre-expanded midsole 34 is foamed, the features of the sole assembly 12 discussed below (channels, notches, and stanchions) can be formed in the midsole 22, which is foamed with supercritical fluid, during the step of compression molding.

The pre-expanded midsole 34 comprises the first polymeric composition having the first density and the second polymeric composition having the second density. The first and second density can be the same or different. In embodiments where the density is different, the density difference between the first and the second density can be less than 20%, less than 10%, less than 5%, less than 4%, less than 3%, less than 2%, or even less than 1%. In other embodiments, the density difference between the first and the second density can be from 1 to 40%, 1 to 30%, 1 to 20%, 1 to 10%, or 1 to 5%. The density difference (%) can be calculated by calculating the absolute value of the difference between the first density and the second density to obtain an absolute difference, dividing the absolute difference by the first density to obtain a quotient, and multiplying the quotient by 100 to obtain the percent density difference. In many embodiments, the first and second densities are within the range of from 0.2 to 2.2 g/cm$^3$.

It should be appreciated that the density difference can go either way, the first density can be greater than the second density or the first density can be less than the second density. The density difference between the first and the second density, either way, can be due to compositional differences between the first and the second polymeric composition. Of course, the density difference, either way, can also be due to pre-expanding the first and/or the second polymeric composition prior to the step of molding.

In one embodiment, the first and the second densities could be the same or substantially similar. For example, if the first and the second polymeric compositions are compositionally the same, the first and the second densities would be the same. If the first and the second polymeric compositions are compositionally similar (e.g., include the same components but have different colorants) the density difference (%) between the first and the second density can be less than 5%, less than 4%, less than 3%, less than 2%, or even less than 1%.

In some embodiments, the rust density is greater than the second density. For example, in embodiments where the rust and the second polymeric compositions are compositionally similar (e.g., the same but have different additives and colorants) and the process relatively direct, the rut density could be greater than the second density. In this example, the resulting interior portion 26 could be cushiony and soft and less dense than the outer portion 24.

In other embodiments, the first density is less than the second density. For example, in embodiments where the first and the second polymeric compositions are compositionally different (e.g., include different polymers) and the process is relatively direct, the first density could be less than the second density. In this example, the resulting interior portion 26 could be gel like and denser than the outer portion 24.

The pre-expanded midsole 34 can be formed so that portions comprising the first polymeric composition and portions comprising the second polymeric composition are in certain areas. For example, as is illustrated, the first polymeric composition can be located at the bottom and sides of the pre-expanded midsole 34 so that it can be expanded to form the exterior portion 24 having the third density, which is configured and shaped to provide structure and energy return and attachment of the outsole 30. The second polymeric composition can be located at the top of the pre-expanded midsole 34 so that it can be expanded to form the interior portion 26, which is configured to provide comfort and support and shaped to define the foot-receiving cavity 28.

The pre-expanded midsole 34 or regions of the pre-expanded midsole 34 can be configured for any type of shape and for any type of shoe style. Shoe styles can include, but are not limited to a trail shoe, the sole assembly 12 thereof can be incorporated into any type or style of footwear, including performance shoes, running shoes, trail boots and boots, work boots, all-terrain shoes, hiking shoes, athletic shoes, running shoes, sneakers, conventional tennis shoes, walking shoes, multisport footwear, sandals, casual shoes, dress shoes or any other type of footwear or footwear components.

The pre-expanded midsole 34 or regions of the pre-expanded midsole 34 can have cavities, pockets, and/or openings that can traverse a portion or any length of a dimension of the portions of the first and/or second polymeric compositions. The pre-expanded midsole 34 can have one or more hollow spaces or cavities such as an interior channel, a chamber, a bladder, and/or a skeleton matrix composed of support walls. In one embodiment, the hollow space can house added components. Such added components can include the addition of a lighting system which can include a power source, integrated circuits, wires, light sources, and/or fiber optics. The hollow space can also house one or more fluid filled bladders, or other cushioning materials such as other foamed materials, including other components expanded using a supercritical fluid, or spring elements. Other added components can include rigid structural supports which can include shanks, plates, or denser polymer materials than a supercritical fluid expanded material.

The mold can be designed to impart textures to the pre-expanded polymeric composition at any portion of the pre-expanded midsole 34. Exemplary textures include any lines, designs, shapes, or patterns. One exemplary texture can include deep patterned indentations to form lugs or outsole protrusions. Another exemplary texture includes a plurality of recessed studs. Another exemplary texture includes a plurality of apertures or holes. Textures can be added to the first surface 36, the second surface 38, and/or the sidewall(s) of the pre-expanded midsole 34. Plus, the second surface 38 can be textured or shaped to function as or in collaboration with the outsole 30. The pre-expanded midsole 34 can be molded to include treads, deeper grooves or sipes, and ornamental features including graphics and logos. The sidewall of the pre-expanded midsole 34 can be textured to include indentations (e.g., notches), and protrusions (e.g., stanchions). Of course, the sidewall of the pre-expanded midsole 34 can be textured to include indentations, and graphics such as logos.

The method can include the step of crosslinking/curing the pre-expanded midsole 34 subsequent to the step of providing in a mold and prior to the step of expanding. Referring again to FIG. 2, the third image (C) illustrated is an example of the pre-expanded midsole 34 that has been crosslinked at a temperature of 175° C. for 500 seconds. Once the pre-expanded midsole 34 comprising the first polymeric composition and the second polymeric composition is molded, the method can include the step of crosslinking/curing the pre-expanded midsole 34. If included, the step of curing may be conducted in a mold or a multicavity mold at a temperature of from 100 to 225° C. or 125 to 200° C. for a duration of from 200 to 800 or 300 to 700 seconds.

Following molding, or following molding and then curing, the pre-expanded midsole 3 is expanded using the supercritical fluid to form the midsole 22. Referring again to FIG. 2, the fourth image (D) illustrated is an example of the pre-expanded midsole 34 that has been expanded, as described below, to form the expanded midsole 22.

The supercritical fluid is selected from nitrogen, carbon dioxide, ethylene, ethane, nitrous oxide, butane, propane, ammonia, acetone, methanol, ethanol, tetrahydrofuran, toluene, water, and combinations thereof. In some embodiments, the subject method utilizes carbon dioxide as the supercritical fluid because of its low Tc, cost, and inert nature. In some preferred embodiments, the subject method utilizes nitrogen as the supercritical fluid. The low operating pressure and temperature of carbon dioxide and nitrogen provide compatibility with most polymers and polymer compositions. Of course, the supercritical fluid can comprise a mixture of carbon dioxide and nitrogen.

The foam density, porosity, mean pore size, and pore size distribution of the midsole can be determined by a variety of parameters that include the foaming process conditions, and the type of the supercritical fluid (e.g., carbon dioxide, nitrogen, etc.), the temperature and pressure during gas solubilization, the pressure release and temperature cooling profile during and after the expansion process. Other expansion parameters include the intrinsic properties of the polymer composition that include the interface, rheological, and thermal properties and the mass transport and absorption of the supercritical fluid.

In one embodiment of the method, the step of the expanding the pre-expanded midsole 34 produces the exterior portion 24 has an average cell size and the interior portion 26 has an average cell size, wherein the average cell size of the exterior portion 24 is greater than the average cell size of the interior portion 26. For example, one embodiment of the method includes the step of expanding the pre-expanded midsole 34 with the supercritical fluid by injecting the first polymeric composition with a first amount of supercritical fluid and the second polymeric composition with a second amount of supercritical fluid wherein the first amount is greater than the second amount such that the interior portion 26 comprising the second polymeric composition has an average cell size that is less than an average cell size of the exterior portion 24 comprising the first polymeric composition.

In another example, a pre-formed and pre-expanded portion of the first polymeric component is co-molded with the second polymeric composition to form the pre-expanded midsole 34, which can then be expanded to yield the interior portion 26 and the exterior portion 24 having different densities. Likewise, a pre-formed and pre-expanded portion of the second polymeric composition is co-molded with the first polymeric composition to form the pre-expanded midsole 34, which can then be expanded to yield the interior portion 26 and the exterior portion 24 having different densities. In both these examples, the steps of providing in a mold and expanding can yield the interior portion and the exterior portion having different densities (and different average cell sizes and/or different cell structures) wherein the first and second polymeric compositions are substantially similar (e.g., comprise the same components with the exception of having different colorants).

The foaming process begins with injection of the supercritical fluid, in solid or liquid form, into a pressurized vessel 40 including the pre-expanded midsole 34, the fourth image (D) of FIG. 2 illustrates the pressurized vessel 40. Under elevated pressure, the supercritical fluid changes phase, e.g., melts and/or vaporizes, to form both a liquid and gas phase. When an interior of the vessel 40 is heated at a controlled rate, the two phases merge to form the supercritical fluid phase having both gas diffusivity properties, but with the density of a liquid. The temperature of the pressurized vessel 40 is typically set to near or below the softening temperature of the polymeric compositions. In many embodiments, the step of expanding is conducted at a temperature of less than 150° C., a pressure of greater than 30 MP for a duration of less than 2.5 hours. In the embodiment illustrated, the step of expanding was conducted at 100° C. for 2 hours at a pressure of greater than 30 MPa in the presence of nitrogen.

The pre-expanded midsole 34 can be held in the pressurized vessel 40 during the step of expanding for any amount time suitable for sufficiently expanding the polymeric composition to the desired size. The hold time can vary depending on components included in the first and the second polymeric compositions. In some exemplary methods, the hold time can be between 1 to 4 hours but should not exceed an amount of time which causes the polymeric composition(s) to expand too much and the foam to become structurally unstable. The pressurized vessel 40 can release pressure rapidly or slowly, during which time, the supercritical fluid is converted to gas within the polymeric composition to expand resulting in the nucleation of cells thereby expanding the pre-expanded midsole 34.

In many embodiments, the midsole 22 has the exterior portion 24 configured to provide structure and energy return and the interior portion 26 configured to provide comfort and support. The exterior portion 24 has the third density and comprises cured, expanded reaction product of the first polymeric composition. The interior portion 26 has the fourth density, which is different than the third density, and comprises cured, expanded reaction product of the second polymeric composition.

The density difference between the third and the fourth density can be less than 10%, less than 9%, less than 8%, less than 7%, less than 6%, less than 5%, less than 4%, less than 3%, less than 2%, or even less than 1%. In some embodiments, the density difference between the third and the fourth density can be from 1 to 40%, 1 to 30%, 1 to 20%, or 1 to 10%. The percent density difference can be calculated by calculating the absolute value of the difference between the third density and the fourth density to obtain an absolute difference, dividing the absolute difference by the third density to obtain a quotient, and multiplying the quotient by 100 to obtain the percent density difference. It should be appreciated that the density difference can go either way, the third density can be greater than the fourth density or the third density can be less than the fourth density. In many embodiments, the third and fourth densities are within the range of from 0.2 to 1.2 g/cm$^3$.

As described previously, in some embodiments, the third density and the fourth density of the exterior and interior portions 24, 26 of the midsole 22 are different. On one hand, the method can employ compositional differences, i.e., differences in the first and second polymeric compositions, to form the exterior and interior portions 24, 26 having different densities. In other words, the step of foaming of the pre-expanded midsole 34 with supercritical fluid can occur by exposing the rust and second polymeric compositions to the same processing conditions (e.g., times, temperatures, and pressures) and yield the exterior and interior portions 24, 26 having different densities due to the first polymeric composition and the second polymeric composition being different.

On the other hand, the exterior and interior portions 24, 26 can have different densities as the result of the method steps employed to form the midsole 22. In some such embodiments, the first composition comprises ethylene vinyl acetate and a first colorant, comprising ethylene vinyl acetate and a second colorant, which is different than the first colorant. In these embodiments, the third and fourth densities are different as a result of expanding the first and second polymeric compositions in the presence of the supercritical fluid. In these embodiments, the first polymeric composition can consist essentially of ethylene vinyl acetate and a first colorant, and the second polymeric composition can consist essentially of ethylene vinyl acetate and a second colorant. For purposes of the subject disclosure "consisting essentially of" can be defined as limiting the composition identified (e.g. the rust polymeric composition) to inclusion of the sub-components identified (e.g., ethylene vinyl acetate and the first colorant), and less than 10, 9, 8, 7, 6, 5, 4, 3, 2, or 1% by weight additional components (e.g. additives, fillers, curatives, etc.), based on a total weight of the component, e.g. the first polymeric composition. In other of these embodiments, the first polymeric composition can consist of ethylene vinyl acetate, the first colorant, and less than 10, 9, 8, 7, 6, 5, 4, 3, 2, or 1% by weight additional components (e.g., additives, film, curatives, etc.), based on a total weight of the first polymeric composition, and the second polymeric composition can consist of ethylene vinyl acetate, the second colorant, and less than 10, 9, 8, 7, 6, 5, 4, 3, 2, or 1% by weight additional components (e.g., additives, fillers, etc.), based on a total weight of the second polymeric composition. In this embodiment, the second colorant can be different than the first colorant.

Of course, the differences in the density of the exterior and interior portions 24, 26 can be the result of: (1) compositional differences, i.e., differences in the first and second polymeric compositions; and (2) as the result of the method steps employed to form the midsole 22.

In some such embodiments, the method can employ "selective" method steps to obtain the desired density difference despite the similarities in the first and second polymeric compositions. In other words, the step of foaming of the pre-expanded midsole 34 with supercritical fluid can occur by exposing the first and second polymeric compositions to different processing conditions (e.g., times, temperatures, and pressures) and yield the exterior and interior portions 24, 26 having different densities due to the different processing conditions. For example, the method can include injecting the rust polymeric composition with a first amount of supercritical fluid and the second polymeric composition with a second amount of supercritical fluid, to form the exterior and interior portions 24, 26 having different densities. As another example, as described above, a pre-formed and pre-expanded portion of the first polymeric component is co-molded with the second polymeric composition to form the pre-expanded midsole 34 or a pre-formed and pre-expanded portion of the second polymeric composition is co-molded with the first polymeric composition to form the pre-expanded midsole 34. In turn, the pre-expanded midsole 34 can then be expanded to yield the interior portion 26 and the exterior portion 24 having different densities (and different average cell size). As yet another example, once formed, the midsole 22 can be compression molded to form the exterior and interior portions 24, 26 having different densities.

The midsole 22 also defines the first surface 36 and the second surface 38. The first surface 36 is at least partially defined by the interior portion 26 and is at least partially bounded by a midsole wall 42 comprising the exterior portion 24. The midsole wall 42 extends around a perimeter of the first surface 36 and defines the foot-receiving cavity 28. The second surface 38 is opposite the first surface 36 and defined by the exterior portion 24. That is, the exterior portion 24 underlies the interior portion 26 and establishes the second surface 38. In some embodiments, the exterior portion 24 has an Asker C hardness that is from about 5 to about 20 units harder than the asker C hardness of the interior portion 26. The hardness optionally can be tested in accordance with American Society for Testing and Materials ("ASTM") test method D2240. More specifically, in some embodiments, the exterior portion 24 has an Asker C hardness of from 33 to 55 or 40 to 50, and the interior portion 26 has an Asker C hardness of from 55 to 75 or 60 to 70.

As is set forth above, the midsole 22 defines the first surface 36 and the second surface 38 opposite the first surface 36 and includes the exterior portion 24 and the interior portion 26. The method includes joining the outsole 30 with the second surface 38 of the midsole 22, the outsole 30 including the ground-contacting surface 32. The step of joining the outsole 30 can be further defined as compression molding the outsole 30 to the second surface 38.

The fifth image (E) of FIG. 2 illustrates the midsole 22 subsequent to compression molding. Just like the injection molding process, the compression molding process can employ a mold designed to impart textures to the first surface 36, the second surface 38 opposite the first surface 36, the interior portion 26, and the exterior portion 24 of the midsole 22. Exemplary textures include any lines, designs, shapes, or patterns. One exemplary texture can include deep patterned indentations to form lugs or outsole protrusions. Another exemplary texture includes a plurality of notches. Another exemplary texture includes a plurality of channels. Textures can be added to the first surface 36, the second surface 38, and/or the midsole wall 42. Plus, the second surface 38 can be textured or shaped to function as or in collaboration with the outsole 30. It should be appreciated that embodiments of the method disclosed herein can compression mold a tread pattern directly on the second surface 38, negating the need for the outsole 30 and the step of joining the outsole 30 with the second surface 38 of the midsole 22. The midsole 22 can be molded to include treads, notches grooves or sipes, channels, and ornamental features including graphics and logos. Of course, the midsole wall 42 of can be textured to include indentations and protrusions, and graphics such as logos. Compression molding can reduce the size of the midsole 22 causing the exterior portion 24 and/or the interior portion 26 to have a greater hardness and density. Just like the injection molding process, the compression molding process can employ a mold designed to impart textures to the first surface 36, the second surface 38 opposite the first surface 36, the interior portion 26, and the exterior portion 24 of the midsole 22.

The sixth image (F) of FIG. 2 illustrates the midsole 22 having the outsole joined thereto. In some embodiments of the method, the step of joining the outsole to midsole can be conducted concurrently with the step of compression molding. In other embodiments of the method, the midsole can be compression molded and then the midsole can be joined via adhesive, another compression molding step, or other joining techniques know in the art.

Figure 3:
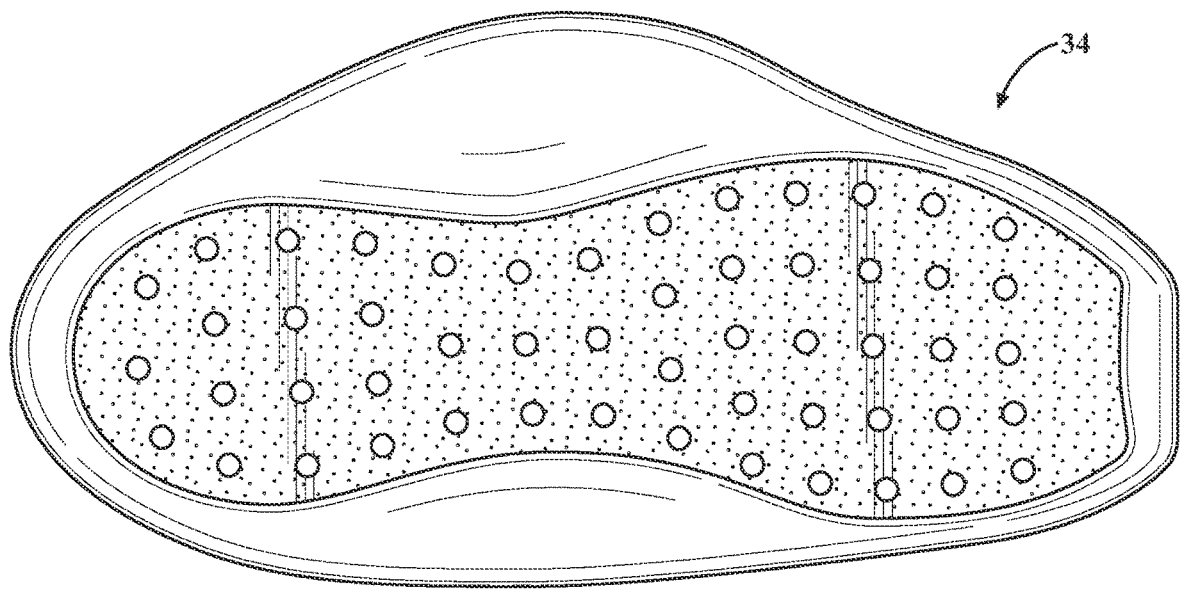
FIG. 3 is a top-view of an embodiment of a pre-expanded midsole comprising a first and a second polymeric composition post molding.
Figure 4:
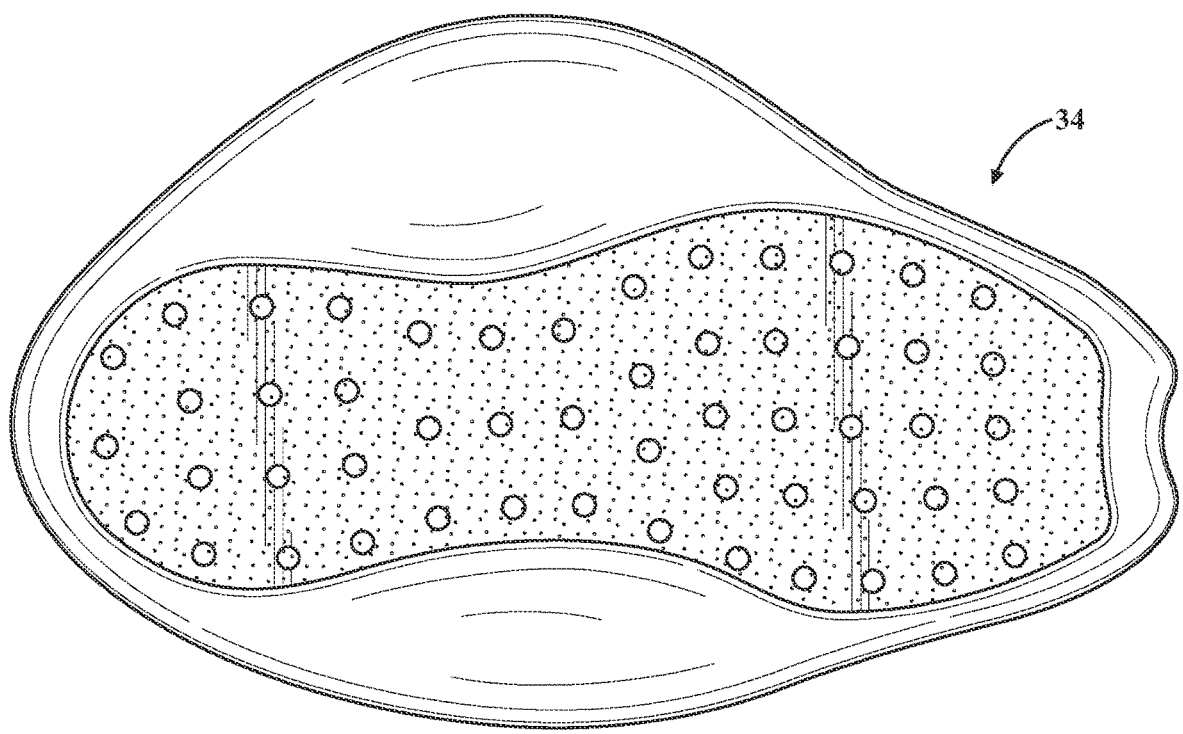
FIG. 4 is a top-view of the pre-expanded midsole of FIG. 3 post cure.
Figure 5:
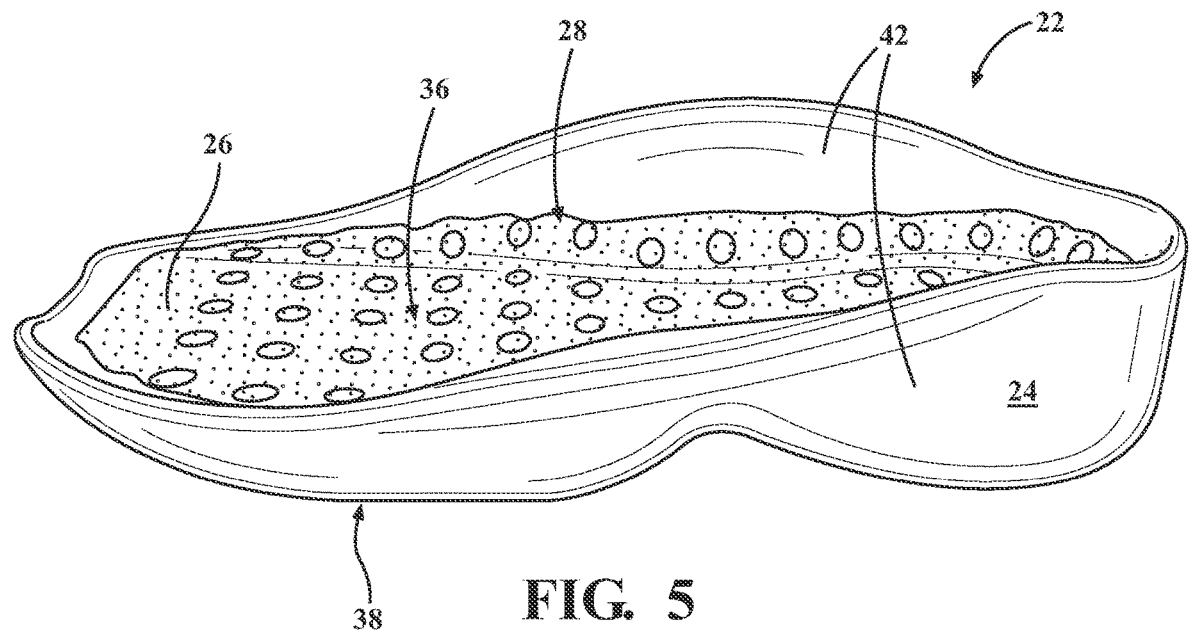
FIG. 5 is a side view of the midsole of FIG. 4 post expansion.
Figure 6:
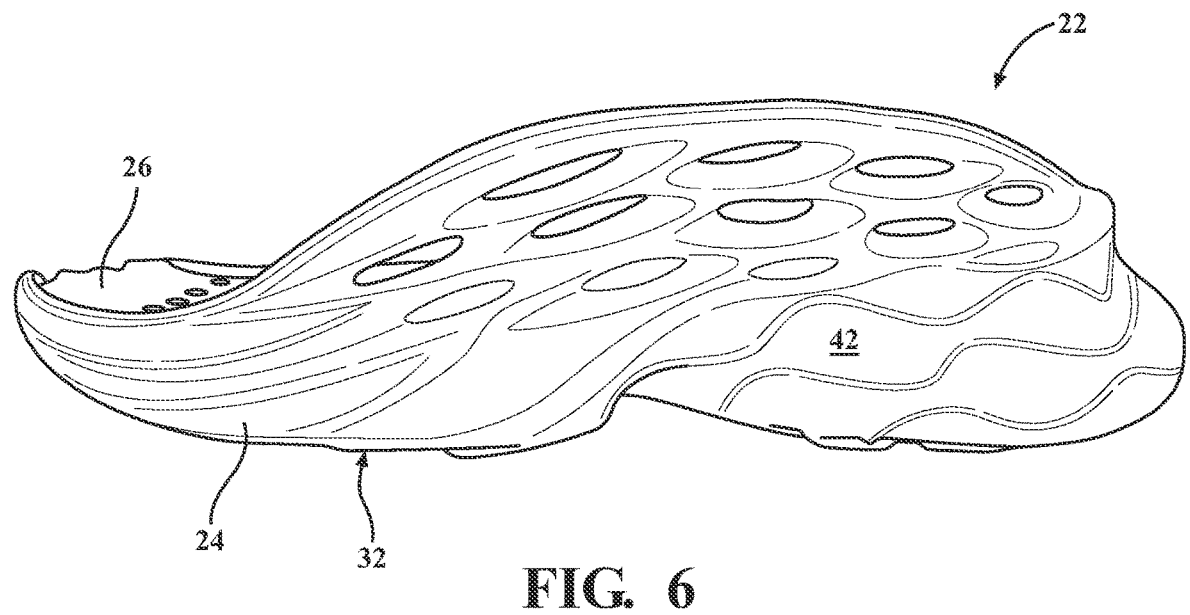
FIG. 6 is a side view of the midsole of FIG. 5 post compression molding.
Figure 7:
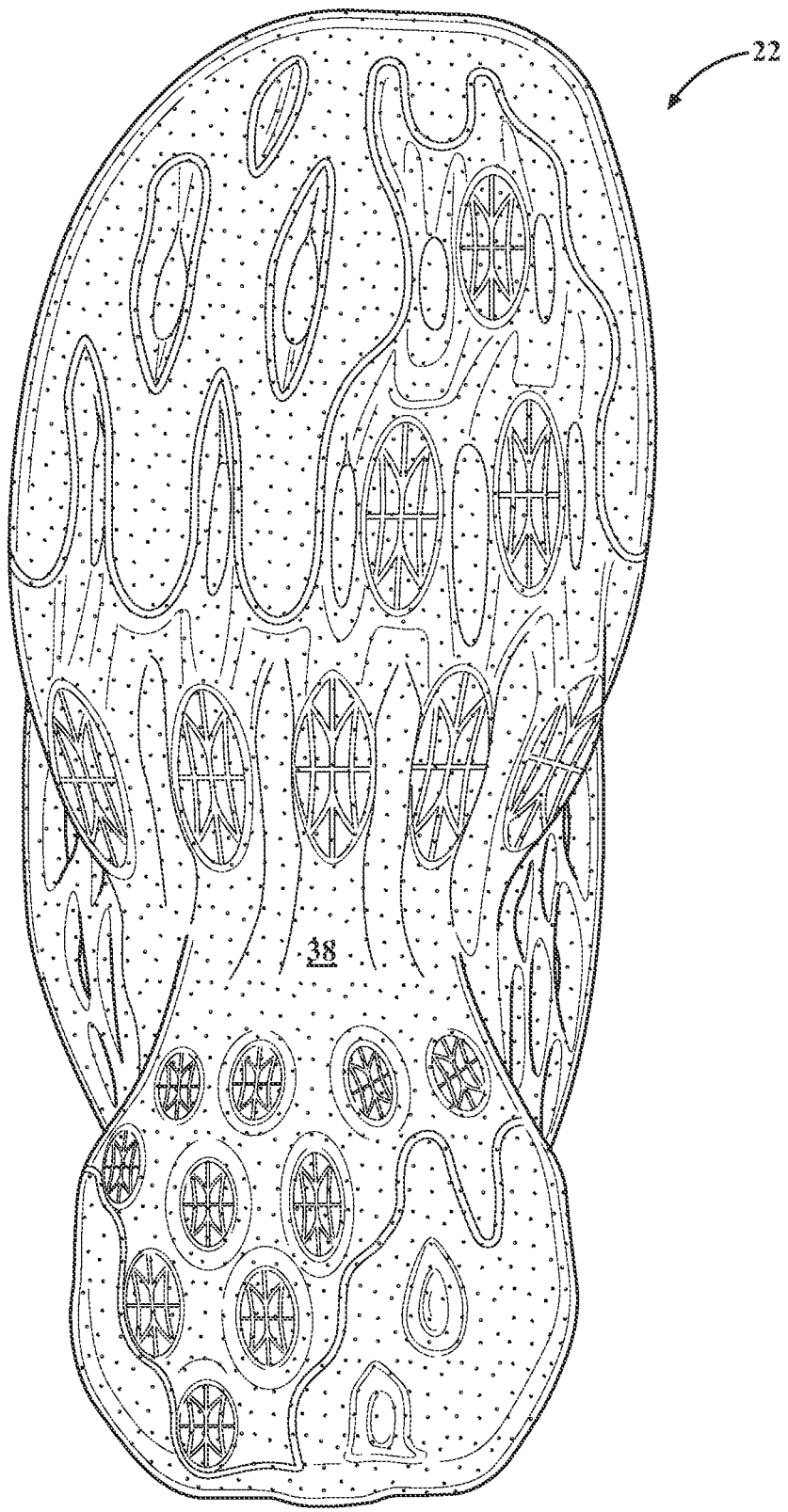
FIG. 7 is a bottom view of the midsole of FIG. 5 post compression molding.
Figure 8:
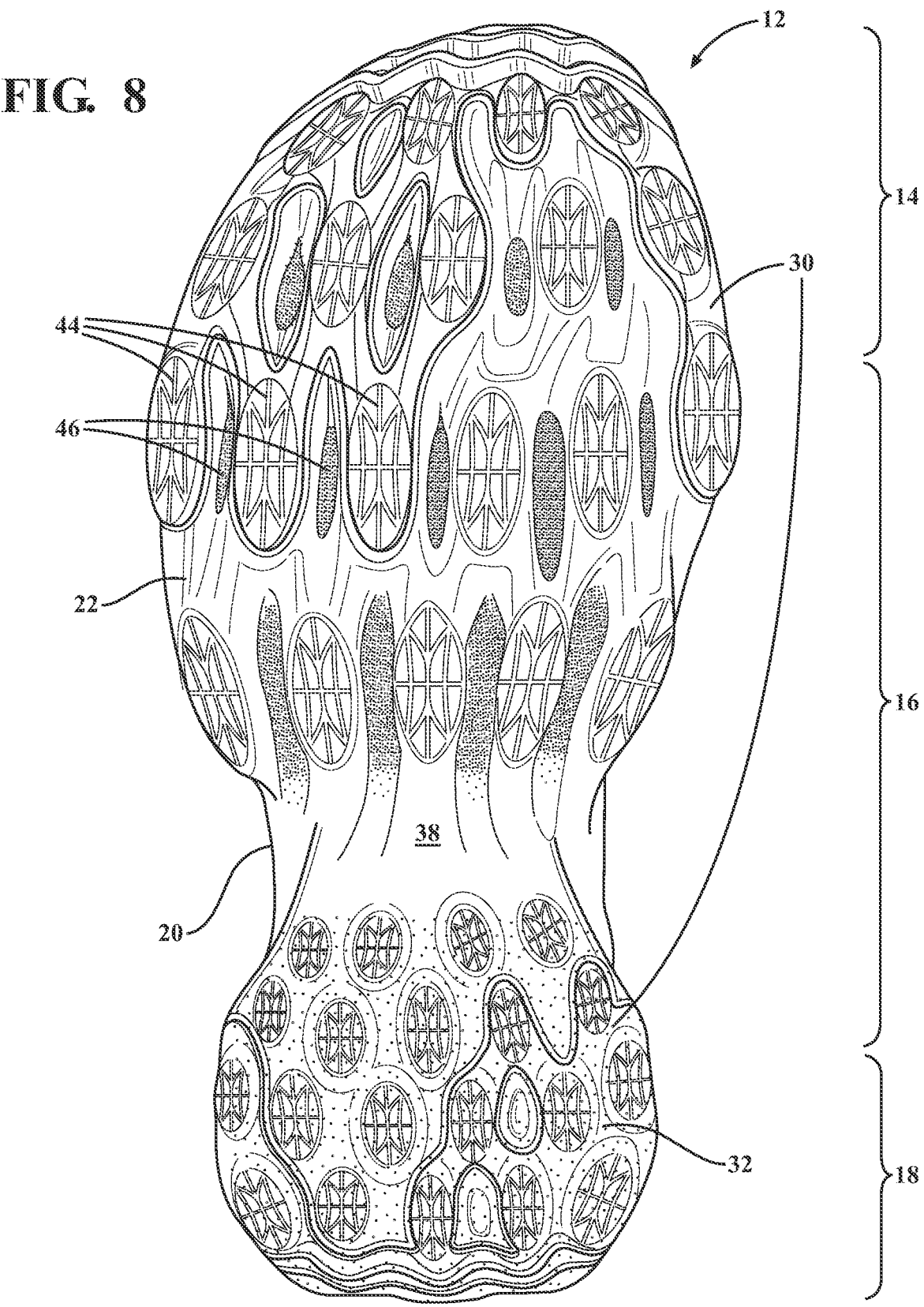
FIG. 8 is a bottom view of the midsole of FIG. 7 with an outsole joined thereto.

Referring now to FIGS. 3-8, the various components of an embodiment of the sole assembly 12 formed with the method are illustrated. FIG. 3 is a top view of the pre-expanded midsole 34 comprising a first polymeric composition and the second composition. FIG. 4 is a top-view of the midsole 22 comprising a cured product of the pre-expanded midsole 34 comprising the first polymeric composition having a first density and second polymeric composition having the second density. FIG. 5 is a side-view of the midsole 22 of FIG. 4. Of course, the pre-expanded midsole 34 illustrated was expanded in the presence of a supercritical fluid to form the midsole 22. The midsole 22 has the exterior portion 24 comprising cured, expanded reaction product of the first polymeric composition having a third density, and the interior portion 26 comprising cured, expanded reaction product of the second polymeric composition having a fourth density. FIGS. 6 and 7 are side and bottom views of the midsole 22 pursuant to compression molding. The first surface 36 of the midsole 22 is at least partially defined by the interior portion 26 and bounded at least partially by the midsole wall 42 comprising the exterior portion 24 extending around a perimeter of the first surface 36. The first surface 36 also defines the foot-receiving cavity 28. The second surface 38 of the midsole 22 is opposite the first surface 36 and defined by the exterior portion 24. In FIG. 8, a bottom view of the sole assembly 12 having the outsole 30 joined thereto is illustrated.

In the example of FIG. 8, the outsole 30 comprises a plurality of segments 44 adjacent the midsole 22, wherein two or more of the plurality of segments 44 are at least partially isolated from each other with portions of the midsole 22 therebetween. The plurality of segments 44 of the outsole 30 are at least partially isolated from one another by a plurality of channels 46 defined by the second surface of the midsole to create a tread pattern having a discontinuous construction adapted for providing energy return and comfort on a variety of terrains at a variety of temperatures. In the example of FIG. 8, each of the plurality of segments 44 of the outsole and each of the plurality of channels defined by the second surface of the midsole 22 extend in a longitudinal direction between a heel region and a midfoot region of the sole assembly. As illustrated in FIGS. 9-14 the plurality of segments of the outsole and the plurality of channels defined by the second surface of the midsole can also extend in a medial direction between a medial periphery of the sole assembly and a lateral periphery of the sole assembly.

The footwear construction can include a textile upper joined with the sole assembly 12. The upper can be formed from a variety of material elements joined together to cover at least a portion of the wearer's foot. The material elements can be selected based on the intended uses of the article of footwear, and can include synthetic textiles, mesh textiles, polymers, or leather, for example. The upper can be constructed to improve the rigidity of the sole assembly 12. For example, the upper can be constructed from leather, plastic, canvas, or other materials. The upper can include one or more closure elements, including for example shoelaces (not shown). The upper additionally includes an upper opening for receiving the wearer's foot and a lower periphery for attachment to the sole assembly 12.

The sole assembly 12 can be combined with any other type or style of upper construction capable of being suitably joined with it, for example, a Strobel construction. The joining of the midsole 22/outsole 30 and the upper can be accomplished using adhesives, cement, injection molding, pour molding or any other technique used to join an upper and the sole assembly 12.

With reference to FIGS. 9-14, a footwear construction 210 comprising a midsole 222 produced with the exemplary method (100) of forming a sole assembly 212 disclosed above will now be described in further detail. The footwear construction 210 comprises the sole assembly 212 including the midsole 222 defining a foot-receiving cavity 228 and an outsole 230. The midsole 222 comprises a cured product of a pre-expanded midsole. The pre-expanded midsole is expanded in the presence of a supercritical fluid. The pre-expanded midsole comprises a first polymeric composition having a first density and second polymeric composition having a second density. The midsole 222 has an exterior portion 224 configured to provide structure and energy return and an interior portion 226 configured to provide comfort and support. The exterior portion 224 has a third density and comprises cured, expanded reaction product of the first polymeric composition. The interior portion 226 has a fourth density, which is different than the third density, and comprises cured, expanded reaction product of the second polymeric composition. Because the first and second portions are foamed with the method described above, they have consistent cell structure with more uniform cell size and thicker cell walls than foams formed via chemical foaming processes. This consistent cell structure provides the exterior portion 224 that is light weight and has excellent energy return or rebound. Plus, the cell structure of the exterior portion 224 provides durability and can be used in conjunction with the outsole 230 to form a tread pattern having a discontinuous construction. The midsole 222 also has a first surface 236 and a second surface 238. This consistent cell structure also provides the interior portion 226 which is comfortable and also provides energy return. The first surface 236 is at least partially defined by the interior portion 226 and is at least partially bounded by a midsole wall 242 comprising the exterior portion 224. The midsole wall 242 extends around a perimeter of the first surface 236 and defines the foot-receiving cavity 228. The second surface 238 is opposite the first surface 236 and defined by the exterior portion 224. The footwear construction 210 is just as described above and includes a forefoot region 214, an arch or midfoot region 216, a heel region 218, and a periphery 220, which are identified in FIGS. 9 and 10.

Figure 9:
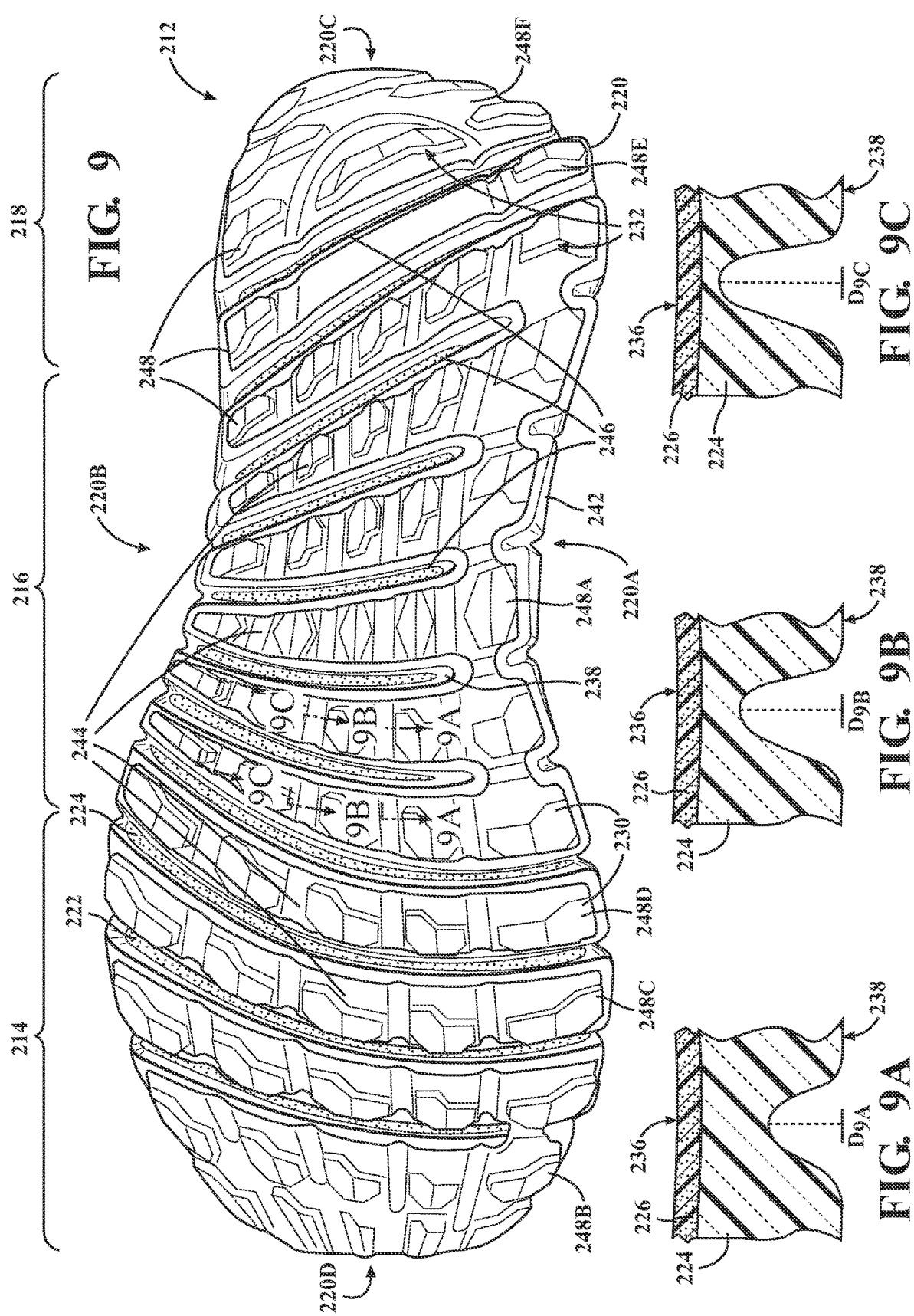
FIG. 9 is a bottom view of another exemplary sole assembly comprising a midsole including an exterior and interior portion with an outsole joined thereto, the sole assembly incorporated into a footwear construction for a right foot.
Figure 10:
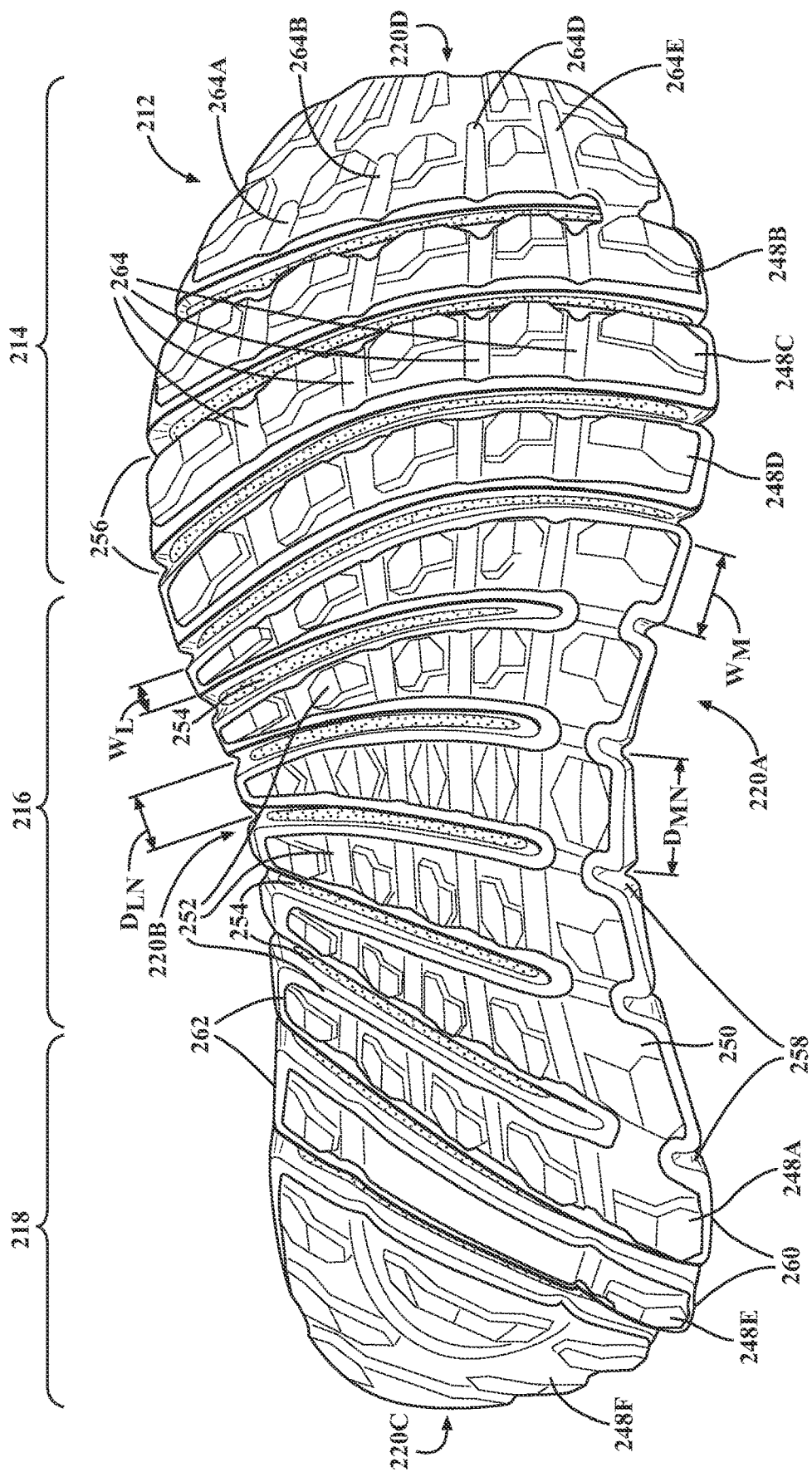
FIG. 10 is a bottom view of an exemplary sole assembly comprising a midsole including an exterior and interior portion with an outsole joined thereto, the sole assembly incorporated into a footwear construction for a left foot corresponding to footwear construction for the right foot of FIG. 9.

The footwear construction 210 also includes the outsole 230. Referring now to FIGS. 9 and 10, the outsole 230 of this embodiment comprises a plurality of segments 244 and defines an upper surface (not shown) and a ground-contacting surface 232. The upper surface of the outsole 230 is adjacent the second surface 238 of the midsole 222, and the ground-contacting surface 232 is adapted for providing traction on a variety of terrains. Two or more of the plurality of segments 244 of the outsole 230 are at least partially separated from each other with portions of the midsole 222 therebetween to create the footwear construction 210, which is adapted for providing comfort and energy return on a variety of terrains at a variety of temperatures.

Still referring to FIGS. 9 and 10, in this embodiment, the plurality of segments 244 of the outsole 230 extends from a medial periphery 220A of the footwear construction 210 towards a lateral periphery 220B of the footwear construction 210. Further, the plurality of segments 244 is at least partially separated from one another with a plurality of channels 246 defined by the second surface 238. The plurality of channels 246 are defined by the exterior portion 224. Because each of the plurality of segments 244 of the outsole 230 are at least partially isolated from one another by the plurality of channels 246 defined by the second surface 238 of the midsole 222, a tread pattern having a discontinuous construction is formed. The tread pattern is well adapted for providing energy return and comfort on a variety of terrains at a variety of temperatures.

As is described with reference to the method above, the exterior portion 224 underlies the interior portion 226 and establishes the second surface 238. Further, the exterior portion 224 is translucent, and the interior portion 226 is colored, and the plurality of channels 246 exhibit a color gradient extending from the medial periphery 220A towards the lateral periphery 220B of the footwear construction 210, the color gradient resulting from a varying thickness of the exterior portion 224 and its adjacency to the interior portion 226. In many embodiments, the exterior portion 224 is translucent, and the interior portion 226 has a color. In the embodiment illustrated, the exterior portion 224 is translucent, and the interior portion 226 is red, so the color gradient from white to pink to red as the channel extends from the medial periphery 220A towards the lateral periphery 220B of the footwear construction 210. Of course, the color of the interior portion 226 can be any color including: black, red, green, blue, purple, orange, yellow, etc. For example, the exterior portion 224 could be translucent, and the interior portion 226 could be black, so the color gradient would be from white to grey to black as the channel extends from the medial periphery 220A towards the lateral periphery 220B of the footwear construction 210. As another example, the exterior portion 224 could be yellow, and the interior portion 226 could be blue, so a color gradient would be from yellow to green to blue as the channel extends from the medial periphery 220A towards the lateral periphery 220B of the footwear construction 210.

The footwear construction 210 is assembled so that the upper surface of the outsole 230 is adjacent the second surface 238 of the midsole 222. Two or more of the plurality of segments 244 of the outsole 230 are at least partially separated from each other with portions of the midsole 222 therebetween. This two-part midsole 222 foamed via supercritical fluid, with a tread pattern comprising the plurality of segments 244 of the outsole 230 and the plurality of channels 246 defined by the second surface 238 of the midsole 222 creates the footwear construction 210 that is adapted for providing comfort and energy return on a variety of terrains at a variety of temperatures.

Still referring to FIGS. 9 and 10, the outsole 230 comprises one or more portions 248. A middle portion 248A of the outsole 230 comprises an arch support segment 250 and a portion 252 of the plurality of segments 244. The arch support segment is adjacent the medial periphery 220A and the portion 252 of the plurality of segments 244 extend in a transverse orientation from the arch support segment 250 towards the lateral periphery 220B. The portion 252 of the plurality of segments 244 is at least partially separated from each other by a portion 254 of the plurality of channels 246 defined by the exterior portion 224. Each portion 252 of the plurality of segments 244 decreases in width as it extends from the medial periphery 220A to the lateral periphery 220B. As illustrated in FIG. 9 and FIGS. 9A-9C, each of the channels increases in depth ($D_{9A}$, $D_{9B}$, and $D_{9C}$) as each of the portion 254 of the plurality of channels 246 extend from the medial periphery 220a to the lateral periphery 220B of sole assembly 212. In this embodiment, the exterior portion 224 defining each channel decreases in thickness as the channel extends from the medial periphery 220A to the lateral periphery 220B.

In the example of FIG. 9, the outsole 230 includes 6 portions including the middle portion 248A described above. Starting at a heel periphery 220C of the heel region 218 and moving in a longitudinal direction towards a forefoot periphery 220D of the forefoot region 214: a first portion 248F, which does not have any of the plurality of segments 244 is joined to the second surface 238; a second portion 248E which is one of the plurality of segments 244 is joined to the second surface 238; a third portion is the middle portion 248A described above; a fourth portion 248D, which is one of the plurality of segments 244 is joined to the second surface 238; a fifth portion 248C, which is one of the plurality of segments 244 is joined to the second surface 238; and finally a sixth portion 248B comprises one of the plurality of segments 244 an is joined to the second surface 238 at the forefoot region 214 of the footwear construction 210.

Figure 11:
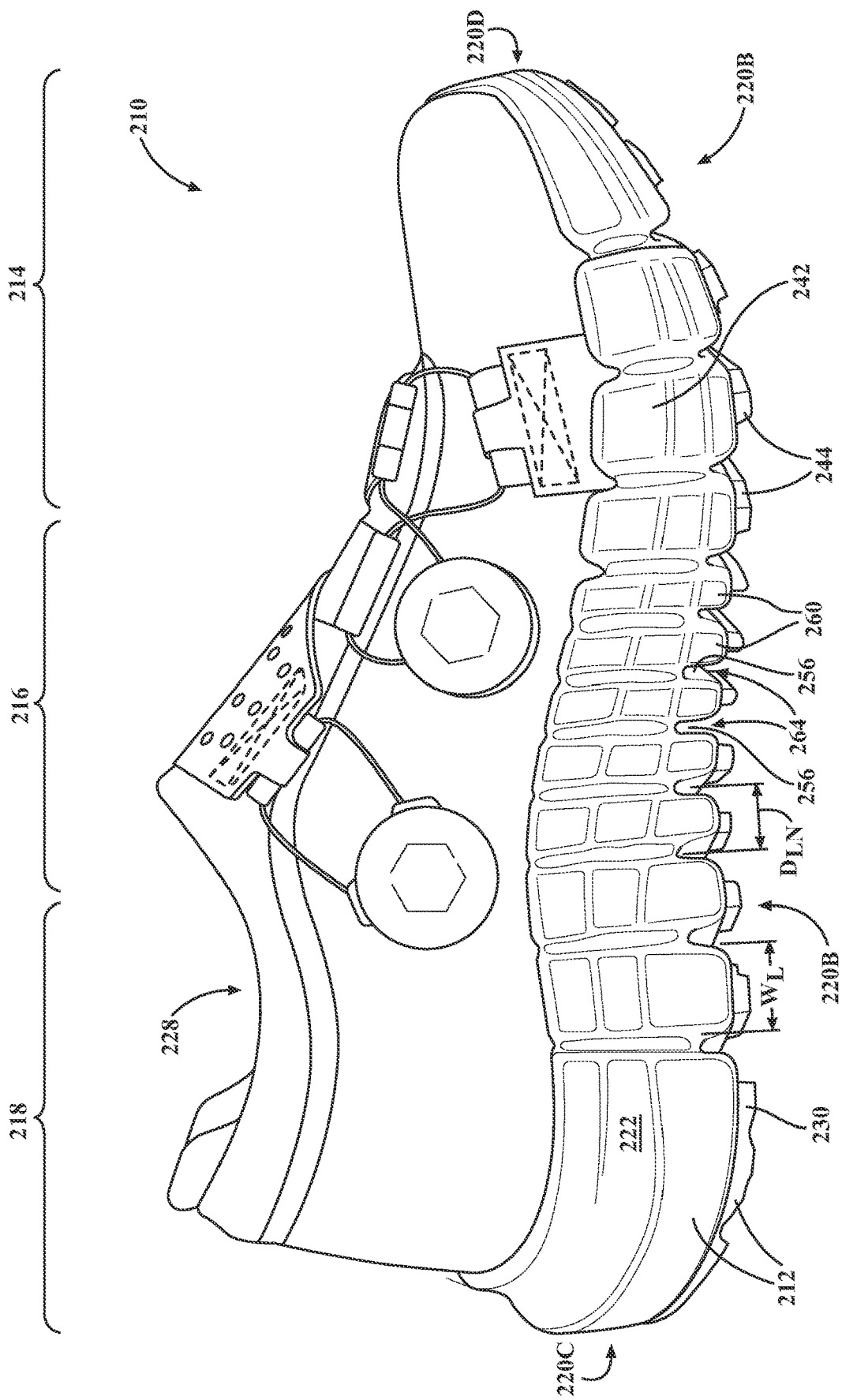
FIG. 11 is a lateral side view of the footwear construction of FIG. 10.
Figure 12:
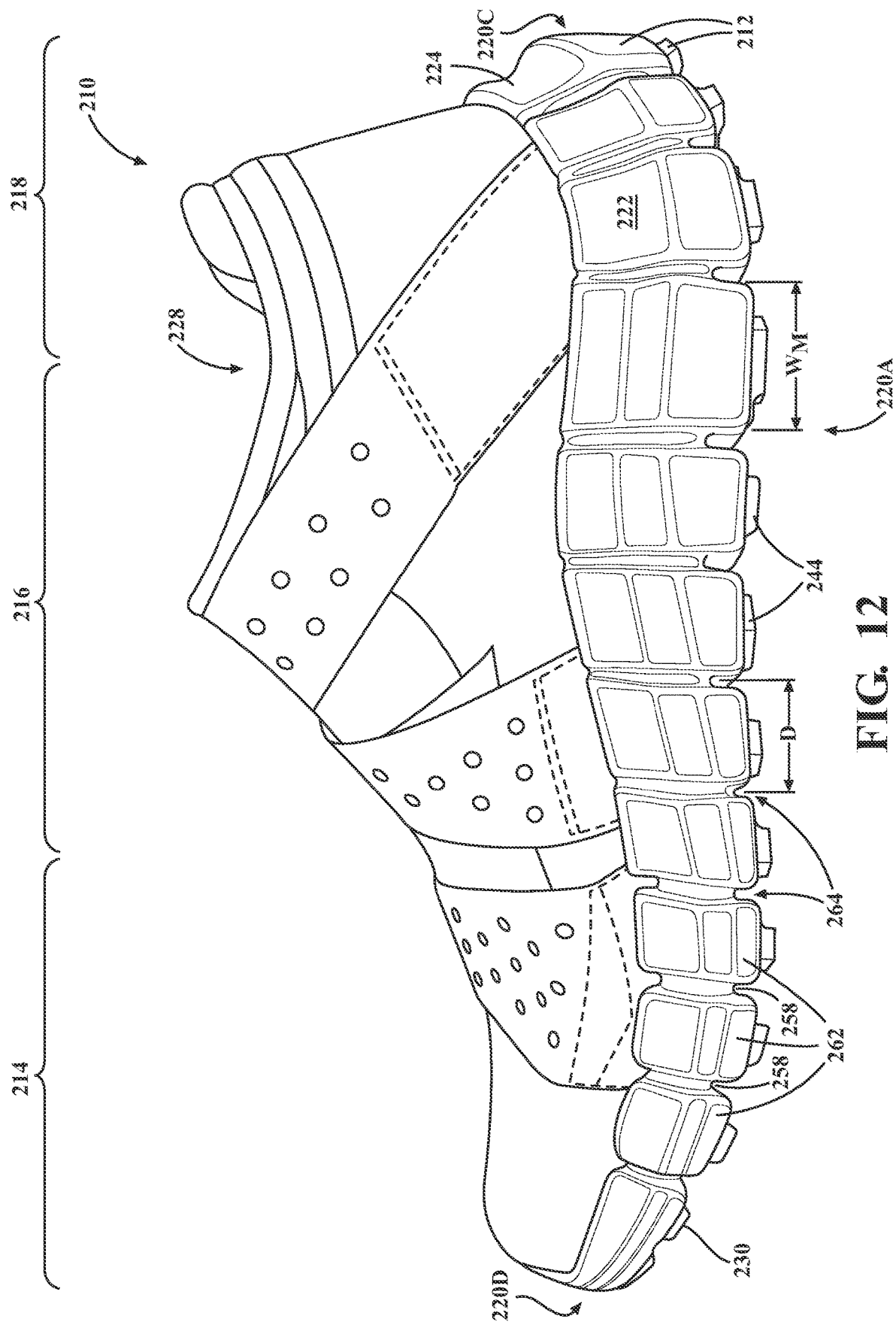
FIG. 12 is a medial side view of the footwear construction of FIG. 10.
Figure 13:
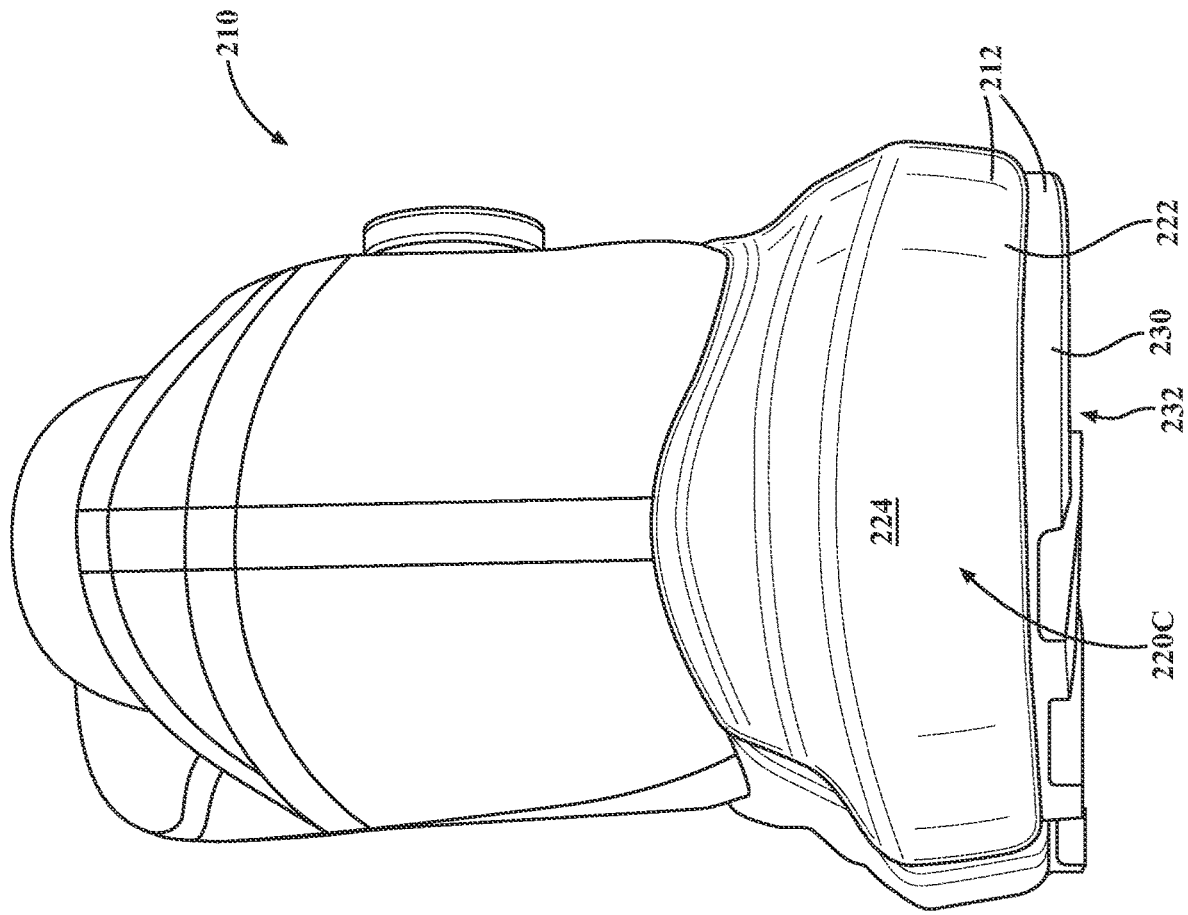
FIG. 13 is a front view of the footwear construction of FIG. 10.
Figure 14:
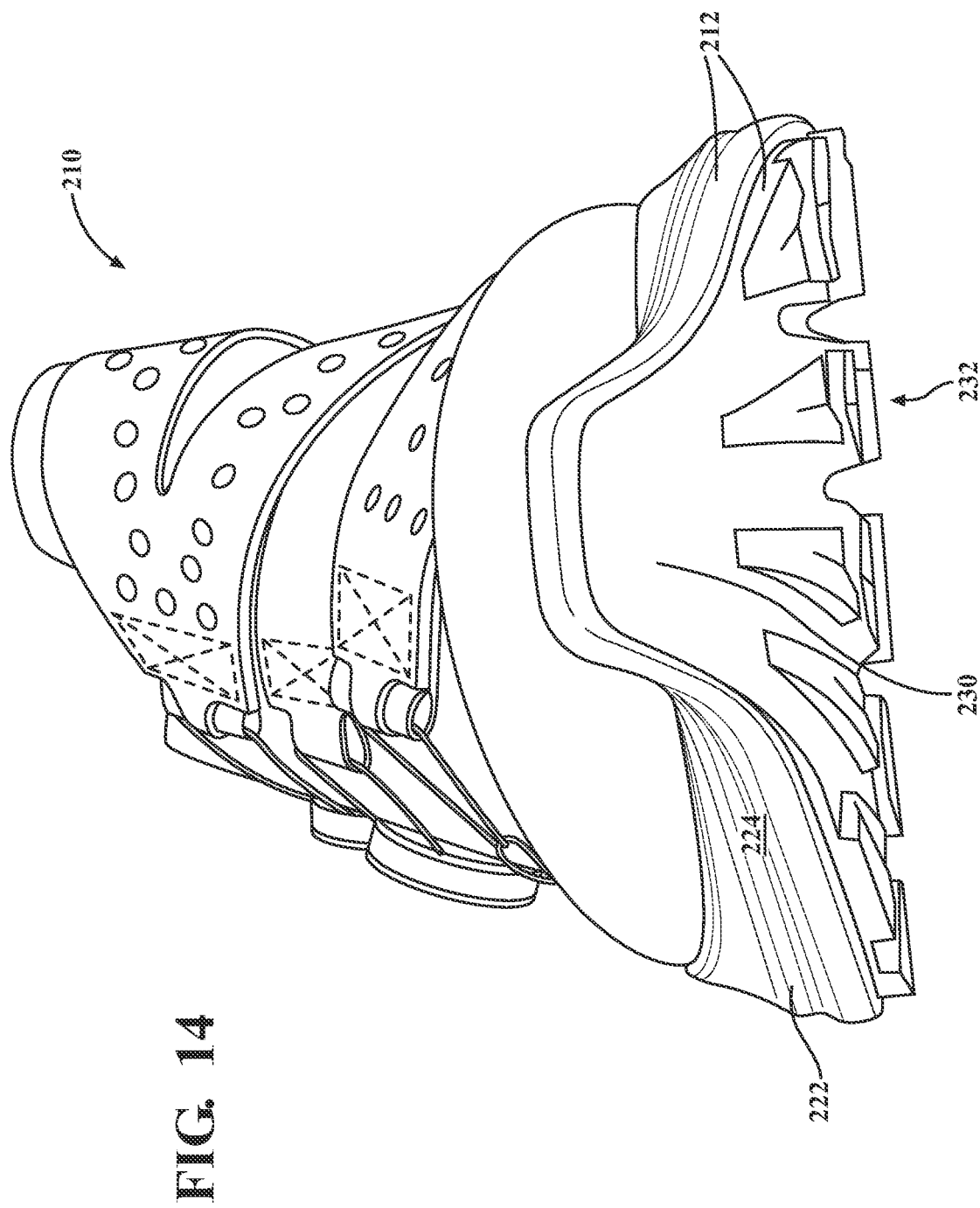
FIG. 14 is a back view of the footwear construction of FIG. 10.

Referring now to FIGS. 11, 12, 13, and 14, the midsole wall 242 comprising the exterior portion 224 is illustrated. The midsole wall 242 extends around the perimeter P of the footwear construction 210. In many embodiments, portions of the midsole wall 242 and the second surface 238 exhibit the color to varying degrees depending on a thickness of the exterior portion 224. This visual effect is the result of the interior portion 226 underlying the interior portion 226 and can be created via the method step of foaming and/or the method step of compression molding. The effect can be due to the shape and size of the exterior and interior portions 224, 226 produced when the pre-expanded midsole is formed. For example, the exterior portion 224 can have varying thickness, and as the exterior portion 224 covering the interior portion 226 becomes thinner, the color of a surface of the interior portion 226 becomes more pronounced. In other words, as the thickness the exterior portion 224 decreases, its translucency increases showing more of the underlining color of the interior portion 226. FIG. 13 is front view of the footwear construction 210 of FIG. 10 showing a front portion of the midsole wall 242 as well as a front portion of the outsole 230 and FIG. 14 is a back view of the footwear construction 210 of FIG. 10 showing a back portion of the midsole wall 242 as well as a back portion of the outsole 230.

Referring now to FIGS. 10, 11, and 12, the midsole wall 242 comprising the exterior portion 224 defines a perimeter surface that extends around a perimeter of the footwear construction 210. The perimeter surface defines a plurality of medial notches 258 on the medial periphery 220A and a plurality of corresponding lateral notches 256 on the lateral periphery 220B. The word corresponding as used herein describes a relationship between each of the plurality of medial notches 258 on the medial periphery 220A and each of the plurality of corresponding lateral notches 256 on the lateral periphery 220B. Referring now to FIGS. 9 and 10, you can visually connect each particular medial notch with each particular lateral notch by following the particular channel which is disposed therebetween laterally across the bottom of the sole assembly 212. This connectable relationship is what is meant by corresponding. So, them is a corresponding lateral notch for each medial notch and vice versa. Along these lines, with specific reference to the midfoot or arch region 216 of FIGS. 9 and 10, a corresponding channel at least partially extends between each of the plurality of corresponding lateral notches 256 and each of the plurality of medial notches 258. The portion of the plurality of segments 244 are at least partially separated from each other by a portion of the plurality of channels defined by the exterior portion 224. Each of the channels increases in depth as each of the portion of the plurality of channels 246 extend from the medial periphery 220A to the lateral periphery 220B. In other words, each of the portion of the plurality of channels 246 decreases in depth as they extend from the lateral periphery 220B to the medial periphery 220A. As explained above, each of the channels have or indicate a color gradient, appearing white where the channel is shallow and progressing to the color of the exterior portion 224 as the channel gets deeper, e.g., from white to pink to red if the underlying interior portion 226 is red.

Each of the plurality of segments 244 of the outsole are at least partially separated from one another with the plurality of channels 246 defined by the second surface 238 and each of the plurality of channels 246 at least partially extends between each of the plurality of corresponding lateral notches 256 and each of the plurality of medial notches 258. A distance $D_{LN}$ between each of the plurality of corresponding lateral notches 256 decreases progressively in a longitudinal direction on the lateral periphery 220B from the heel region 218 to the midfoot region 216 and the distance between each of the plurality of corresponding lateral notches 256 increases progressively in a longitudinal direction on the lateral periphery 220B from the midfoot region 216 to the forefoot region 214. In other words, the distance $D_{LN}$ between each of the plurality of corresponding lateral notches 256 is greater in the forefoot region 214 and the heel region 218 than the distance $D_{LN}$ between each of the plurality of corresponding lateral notches 256 in the midfoot region 216. That is, the distance between each of the each of the plurality of corresponding lateral notches 256 is least in the midfoot region.

A distance $D_{MN}$ between each of the plurality of medial notches 258 increases progressively in a longitudinal direction on the medial periphery 220A from the heel region 218 to the midfoot region 216 and the distance between each of the plurality of medial notches 258 decreases progressively in a longitudinal direction on the medial periphery 220A from the midfoot region 216 to the forefoot region 214. In other words, the distance $D_{MN}$ between each of the plurality of medial notches 258 is less in the forefoot region 214 and the heel region 218 than the distance $D_{MN}$ between each of the plurality of medial notches 258 in the midfoot region 216. That is, the distance between each of the each of the medial notches 258 is greatest in the midfoot region. As such, the widths of the medial notches 258 (wider in the midfoot region 216 and narrower in the forefoot and heel regions 214, 218) are generally inverse the widths of the plurality of corresponding lateral notches 256 (narrower in the midfoot region 216 and wider in the forefoot and heel regions 214, 218).

Referring again to FIGS. 9, 11, and 12, the midsole wall 242 the sole assembly 212 includes a plurality of medial stanchions 262 and a plurality of corresponding lateral stanchions 260. FIG. 12 is a medial side view of the footwear construction of FIG. 9, which provides a side view of the plurality of medial stanchions 262. FIG. 11 is a lateral side view of the footwear construction of FIG. 10, which provides a side view of the plurality of corresponding lateral stanchions 260. The plurality of corresponding lateral stanchions 260 is disposed between the plurality of corresponding lateral notches 256 and the plurality of medial stanchions 262 is disposed between the plurality of medial notches 258. The word corresponding as used herein describes a relationship between each of the plurality of medial stanchions 262 and each of the plurality of corresponding lateral stanchions 260. Referring now to FIGS. 9 and 10, you can visually connect each particular medial stanchion with each particular segment of the outsole 230 by following the particular segment which is disposed therebetween laterally across the bottom of the sole assembly 212. This connectable relationship is what is meant by corresponding. So, there is a corresponding lateral stanchion for each medial stanchion and vice versa.

Each of the plurality of corresponding lateral stanchions 260 have a width $W_L$ and each of the plurality of medial stanchions 262 have a width $W_M$. The width $W_L$ of each of the plurality of corresponding lateral stanchions 260 is less than the width $W_M$ of each of the plurality of medial stanchions 262 in the midfoot region 216 of the sole assembly 212. Further, the width $W_L$ of each of the plurality of corresponding lateral stanchions 260 decreases progressively in a longitudinal direction on the lateral periphery 220B from the heel region 218 to the midfoot region 216 and the width $W_L$ of each of the plurality of corresponding lateral stanchions 260 increases progressively in a longitudinal direction on the lateral periphery 220B from the midfoot region 216 to the forefoot region 214. In other words, the stanchions 260 on the lateral periphery 220B in the midfoot region 216 are narrower than the stanchions 260 on the lateral periphery 220B of the forefoot and heel regions 214, 218. That is, the plurality of corresponding lateral stanchions 260 are narrowest in the midfoot region 216. Still further, the width $W_M$ of each of the plurality of medial stanchions 262 increases progressively in a longitudinal direction on the medial periphery 220A from the heel region 218 to the midfoot region 216 and the width $W_M$ of each of the plurality of medial stanchions 262 decreases progressively in a longitudinal direction on the medial periphery 220A from the midfoot region 216 to the forefoot region 214. In other words, the medial stanchions 262 on the medial periphery 220A in the midfoot region 216 are wider than the lateral stations 260 on the lateral periphery 220B of the forefoot and heel regions 214, 218. That is, the plurality of medial stanchions 262 are widest in the midfoot region 216.

Referring now to FIG. 9, each of the plurality of corresponding lateral stanchions 260 corresponds with each of the plurality of segments 244 of the outsole 230 and, in-turn, each of the plurality of segments 244 of the outsole 230 correspond with each of the plurality of medial stanchions 262. In the midfoot region 216 of the footwear construction, each segment of the outsole becomes narrower as it progresses in a lateral direction from the medial periphery to the lateral periphery of the sole assembly 212. Further, in the midfoot region 216, a wider medial stanchion supports the wider end of the segment of the outsole on the medial periphery of the sole assembly 212, and a narrower corresponding lateral stanchion supports the narrower end of the segment of the outsole on the lateral periphery of the sole assembly 212.

As described above, a corresponding channel at least partially extends between each of the plurality of corresponding lateral notches 256 and each of the plurality of medial notches 258. This is best illustrated in FIGS. 9 and 10. In addition, from a tread perspective, the plurality of segments 244 defines a plurality of grooves 264 that extend longitudinally between the heel region 218 and the midfoot region 216. For example, as illustrated in FIGS. 9 and 10, the plurality of segments 244 defines 4 grooves (264A, 264B, 264D, 264E) that extend longitudinally between the heel region 218 and the midfoot region 216. These grooves are rounded off in the heel region 218 so that the inner two grooves (264B, 264C) connect, and the outer two grooves connect (264A, 264D). In the forefoot region 214 the four grooves simply extend to a front perimeter of the footwear construction 210. Since the plurality of segments 244 are at least partially separated from one another with the plurality of channels 246 that am transverse to the plurality of grooves 264. As such a grided tread pattern is created. That is the plurality of channels 246, plurality of segments 244, and the plurality of grooves 264 forms a grid like pattern to provide flexibility and traction.

Ultimately, the central portion of the outsole 230 comprising the arch support segment adjacent the medial periphery 220A and the portion of the plurality of segments 244 each of which extend from a notch on the medial side surface to a corresponding notch on the lateral side surface in a transverse orientation in combination with the plurality of channels defined by the midsole 222 comprising the exterior portion 224 and the interior portion 226 having different densities provides comfort and energy return on a variety of terrains at a variety of temperatures.

It should be appreciated that alternative embodiments (embodiments not specifically discussed or illustrated) of the sole assembly are contemplated in the subject disclosure. For example, the sole assembly can have a structure that is inverse the structure described above. In such embodiments, the perimeter surface can define a plurality of medial notches and a plurality of corresponding lateral notches as well as a plurality of medial stanchions disposed between the plurality of medial notches and a plurality of corresponding lateral stanchions disposed between the plurality of corresponding of lateral notches. The outsole can define an upper surface and a ground-contacting surface. The upper surface of the outsole can be adjacent the second surface of the midsole. The outsole can comprise a plurality of segments at least partially separated from one another with a plurality of channels defined by the exterior portion. Each of the plurality of channels can extend in a lateral direction between each of the plurality of medial notches and each of the plurality of corresponding lateral notches. Each of the plurality of segments extends in a lateral direction between each of the plurality of medial stanchions and each of the plurality of corresponding lateral stanchions. However, in this embodiment, at least a portion of the plurality channels decreases in depth as the plurality of channels extend between a lateral periphery of the footwear construction and a medial periphery of the footwear construction. Likewise, each of the plurality of medial stanchions have a width and each of the plurality of corresponding lateral stanchions have a width, and the width of each of the plurality of medial stanchions is less than the width of each of the plurality of the corresponding lateral stanchions in a midfoot region of the footwear construction. Further, the distance between each of the plurality of medial notches is greater in the forefoot region and the heel region than the distance between each of the plurality of medial notches in the midfoot region, i.e., the distance between the medial stanchions is least in the midfoot region. In turn, the stanchions on the lateral periphery of the midfoot region are wider than the stations on the lateral periphery of the forefoot and heel regions. In this alternative embodiment, inverse to the illustrations of FIGS. 9 and 10, the width of each of the plurality of corresponding lateral stanchions is greater than the width of each of the plurality of corresponding medial stanchions in the midfoot region of the sole assembly.

Statement A. A method of forming a sole assembly for a footwear construction comprises: providing in a mold a first polymeric composition having a first density and a second polymeric composition having a second density to form a pre-expanded midsole; expanding the pre-expanded midsole using a supercritical fluid to form a midsole, the midsole defining a first surface and a second surface opposite the first surface and including an exterior portion having a third density and an interior portion having a fourth density different than the third density; and joining an outsole with the second surface of the midsole.

Statement B. The method of statement, wherein the third density is greater than the fourth density.

Statement C. The method of statement A further comprising the step of curing the pre-expanded midsole subsequent to the step of providing in a mold and prior to the step of expanding.

Statement D. The method of statement C wherein the step of curing is conducted at a temperature of from 150 to 225° C. for a duration of from 200 to 800 seconds.

Statement E. The method of any preceding statement wherein the step of expanding includes the step of applying a pressure of greater than 30 MPa to the pre-expanded midsole in the presence of nitrogen.

Statement F. The method of statement E wherein pressure is applied at a temperature of less than 150° C. for a duration of less than 2.5 hours.

Statement G. The method of any preceding statement wherein the first polymeric composition comprises ethylene vinyl acetate.

Statement H. The method of any preceding statement wherein the first polymeric composition comprises titanium dioxide.

Statement I. The method of any preceding statement wherein the exterior portion, which is formed from the first polymeric composition, is translucent.

Statement J. The method of any preceding statement wherein the second polymeric composition comprises ethylene vinyl acetate.

Statement K. The method of any preceding statement wherein the second polymeric composition further comprises a colorant.

Statement L. The method of any preceding statement wherein the second polymeric composition further comprises an olefinic copolymer, which is less dense than the EVA.

Statement M. The method of any preceding statement wherein the olefinic copolymer is further defined as an olefin block copolymer.

Statement N. The method of any preceding statement wherein the olefinic copolymer is further defined as a polyolefin elastomer.

Statement O. The method of statement N wherein the polyolefin elastomer is a random copolymer of ethylene-butene or a random copolymer of ethylene-octene.

Statement P. The method of any preceding statement wherein the outsole has an upper surface and a ground contacting surface and wherein the step of joining the outsole is further defined as compression molding the upper surface of the outsole to the second surface of the midsole.

Statement Q. The method of any preceding statement wherein the exterior portion comprises a cured, foamed reaction product of the first polymeric composition and the interior portion comprises a cured, foamed reaction product of the second polymeric composition, wherein the exterior portion is configured to provide structure and energy return and the interior portion is configured to provide comfort and support.

Statement R. The method of any preceding statement wherein the exterior portion has an Asker C hardness that is from about 5 to about 20 units harder than the asker C hardness of the interior portion.

Statement S. The method of any preceding statement wherein the exterior portion has an average cell size, and the interior portion has an average cell size, wherein the average cell size of the exterior portion is greater than the average cell size of the interior portion.

Statement T. The method of any preceding statement wherein the step of expanding the pre-expanded midsole with the supercritical fluid comprises injecting the first polymeric composition with a first amount of supercritical fluid and the second polymeric composition with a second amount of supercritical fluid to form the interior portion having an average cell size that is less than an average cell size of the exterior portion.

Statement U. The method of any preceding statement wherein the exterior portion defines the second surface, and the interior portion at least partially defines the first surface and a foot-receiving cavity.

Statement V. The method of any preceding statement wherein the outsole comprises a plurality of segments adjacent the midsole, wherein two or more of the plurality of segments are at least partially isolated from each other with portions of the midsole therebetween.

Statement W. The method of any preceding statement wherein each of the plurality of segments of the outsole are at least partially isolated from one another by a plurality of channels defined by the second surface of the midsole to create a tread pattern having a discontinuous construction adapted for providing energy return and comfort on a variety of terrains at a variety of temperatures.

Statement X. The method of any preceding statement wherein each of the plurality of segments of the outsole and each of the plurality of channels defined by the second surface of the midsole extend in a longitudinal direction between a heel region and a midfoot region of the sole assembly.

Statement Y. The method of any preceding statement wherein the plurality of segments of the outsole and the plurality of channels defined by the second surface of the midsole extend in a medial direction between a medial periphery of the footwear construction and a lateral periphery of the footwear construction.

Statement AA. A footwear construction defining a foot-receiving cavity, the footwear construction comprising a midsole and an outsole. The midsole comprises a cured product of a pre-expanded midsole comprising a first polymeric composition having a first density and a second polymeric composition having a second density. The pre-expanded midsole expanded in the presence of a supercritical fluid. The midsole has and exterior portion and an interior portion. The exterior portion comprises cured, expanded reaction product of the first polymeric composition and has a third density. The exterior portion is configured to provide structure and energy return. The interior portion comprises cured, expanded reaction product of the second polymeric composition and has a fourth density. The interior portion configured to provide comfort and support. The midsole defines a first and a second surface. The first surface is at least partially defined by the interior portion and bounded at least partially by a midsole wall comprising the exterior portion. The midsole wall comprising a perimeter of the first surface and defining the foot-receiving cavity. The second surface is opposite the first surface and defined by the exterior portion. The outsole defines an upper surface and a ground-contacting surface. The upper surface of the outsole adjacent the second surface of the midsole and the ground-contacting. The outsole comprises a plurality of segments and two or more of the plurality of segments are at least partially separated from each other with portions of the midsole therebetween to create the footwear construction.

Statement BB the footwear construction of statement AA, wherein the plurality of segments extends in a lateral direction between a medial periphery of the footwear construction and a lateral periphery of the footwear construction.

Statement CC. The footwear construction of statement BB, wherein the plurality of segments am at least partially separated from one another with a plurality of channels defined by the second surface, which comprises the exterior portion.

Statement DD. The footwear construction of any preceding footwear construction statement, wherein the exterior portion is translucent, and the interior portion is colored, and the plurality of channels exhibit a color gradient extending from the medial periphery towards the lateral periphery of the footwear construction. The color gradient resulting from a varying thickness of the exterior portion being adjacent to the interior portion.

Statement EE. The footwear construction of any preceding footwear construction statement, wherein the outsole comprises one or more portions.

Statement FF. The footwear construction of statement EE, wherein a central portion of the outsole comprises an arch support segment and a portion of the plurality of segments, wherein the arch support segment is adjacent a medial periphery and the portion of the plurality of segments extend from the arch support segment in a lateral direction towards a lateral periphery of the footwear construction.

Statement GG. The footwear construction of statement FF, wherein the portion of the plurality of segments are at least partially separated from each other by a plurality of channels defined by the exterior portion.

Statement HH. The footwear construction of statement GG, wherein each of portion of the plurality channels increases in depth as they extend between a medial periphery of the footwear construction and a lateral periphery of the footwear construction.

Statement II. The footwear construction of statement GG, wherein the exterior portion defining each of the portion of the plurality of channels decreases in thickness as the channel extends between a medial periphery of the footwear construction and a lateral periphery of the footwear construction.

Statement JJ. The footwear construction of any preceding footwear construction statement, wherein the exterior portion has an Asker C hardness of from 33 to 55.

Statement KK. The footwear construction of any preceding footwear construction statement, wherein the interior portion has an Asker C hardness of from 55 to 75.

Statement LL. The footwear construction of any preceding footwear construction statement, wherein the exterior portion underlies the interior portion and establishes the second surface.

Statement MM. The footwear construction of any preceding footwear construction statement, wherein the exterior portion is translucent, and the interior portion has a color.

Statement NN. The footwear construction of statement MM, wherein visible portions of the midsole wall and the second surface exhibit the color to varying degrees depending on a thickness of the exterior portion and the interior portion adjacent thereto.

Statement OO. The footwear construction of any preceding footwear construction statement, wherein the midsole wall comprising the exterior portion defines a perimeter surface that extends around a perimeter of the sole assembly.

Statement PP. The footwear construction of statement OO, wherein a plurality of medial notches on the medial periphery are defined by the perimeter surface and a plurality of corresponding medial notches on the medial periphery a defined by the perimeter surface.

Statement QQ. The footwear construction of statement PP, wherein each of the plurality of segments am at least partially separated from one another with a plurality of channels defined by the second surface and each of the plurality of channels at least partially extends between each of the plurality of medial notches and each of the plurality of corresponding lateral notches.

Statement RR. The footwear construction of statement PP, wherein a distance between each of the plurality of corresponding lateral notches decreases progressively in a longitudinal direction on the lateral periphery from the heel region to the midfoot region and the distance between each of the plurality of corresponding lateral notches increases progressively in a longitudinal direction on the lateral periphery from the midfoot region to the forefoot region.

Statement SS. The footwear construction of statement PP, wherein a plurality of medial stanchions is disposed between the plurality of medial notches and a plurality of corresponding lateral stanchions is disposed between the plurality of corresponding lateral notches.

Statement TT. The footwear construction of statement SS, wherein each of the plurality of medial stanchions have a width $W_M$, and each of the plurality of corresponding lateral stanchions have a width $W_L$. The width $W_M$ of each of the plurality of medial stanchions is greater than the width $W_L$ of each of the plurality of corresponding lateral stanchions in the midfoot region.

Statement UU. The footwear construction of statement SS, wherein the width $W_L$ of each of the plurality of corresponding lateral stanchions decreases progressively in a longitudinal direction on the lateral periphery from the heel region to the midfoot region and the width $W_L$ of each of the plurality of corresponding lateral stanchions increases progressively in a longitudinal direction on the lateral periphery from the midfoot region to the forefoot region.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

In addition, when a component, part or layer is referred to as being "joined with," "on," "engaged with," "adhered to," "secured to," or "coupled to" another component, part or layer, it can be directly joined with, on, engaged with, adhered to, secured to, or coupled to the other component, part or layer, or any number of intervening components, parts or layers can be present. In contrast, when an element is referred to as being "directly joined with," "directly on," "directly engaged with," "directly adhered to," "directly secured to," or "directly coupled to" another element or layer, there can be no intervening elements or layers present. Other words used to describe the relationship between components, layers and parts should be interpreted in a like manner, such as "adjacent" versus "directly adjacent" and similar words. As used herein, the term "and/or" includes all combinations of one or mom of the associated listed items.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention can be replaced by alternative elements that provide similar functionality or otherwise provide adequate operation. This includes, for example, presently known alternative elements, such as those that might be currently known to one skilled in the art, and alternative elements that can be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all these features or that provide all the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, any combination of X, Y and Z, for example, X, Y, Z; X, Y; X, Z; Y, Z, and/or any other possible combination together or alone of those elements, noting that the same is open ended and can include other elements.

What is claimed is:

1. A method of forming a sole assembly for a footwear construction, the method comprising:
   providing in a mold a first polymeric composition having a first density and a second polymeric composition having a second density to form a pre-expanded midsole;
   expanding the pre-expanded midsole using a supercritical fluid to form a midsole, the midsole defining a first surface and a second surface opposite the first surface and including an exterior portion having a third density and an interior portion having a fourth density different than the third density; and
   joining an outsole with the second surface of the midsole,
   wherein the first polymeric composition comprises ethylene vinyl acetate and titanium dioxide,
   wherein the second polymeric composition comprises ethylene vinyl acetate and a colorant.

2. The method of claim 1 comprising:
   curing the pre-expanded midsole subsequent to the step of providing in a mold and prior to the step of expanding, wherein step of curing is conducted at a temperature of from 150° C. to 225° C. for a duration of from 200 seconds to 800 seconds.

3. The method of claim 1,
   wherein the step of expanding is conducted at a temperature of less than 150° C. for a duration of less than 2.5 hours.

4. The method of claim 1,
   wherein the second polymeric composition further comprises an olefin block copolymer and/or a polyolefin elastomer.

5. The method of claim 1,
   wherein the exterior portion is translucent and comprises a cured, foamed reaction product of the first polymeric composition and the interior portion is colored and comprises a cured, foamed reaction product of the second polymeric composition,
   wherein at least one of the second surface and a sidewall of the midsole exhibit a color gradient resulting from a varying thickness of the exterior portion and the interior portion adjacent thereto.

6. The method of claim 1,
wherein the outsole has an upper surface and a ground contacting surface,
wherein the step of joining the outsole is further defined as compression molding the upper surface of the outsole to the second surface of the midsole.

7. The method of claim 1,
wherein the exterior portion has an Asker C hardness that is from about 5 units to about 20 units harder than the Asker C hardness of the interior portion,
wherein the exterior portion is configured to provide structure and energy return and the interior portion is configured to provide comfort and support.

8. The method of claim 1,
wherein the step of expanding the pre-expanded midsole with the supercritical fluid comprises injecting the first polymeric composition with a first amount of the supercritical fluid and the second polymeric composition with a second amount of the supercritical fluid, to form an interior portion having an average cell size that is less than an average cell size of the exterior portion.

9. The method of claim 1,
wherein the outsole comprises a plurality of segments adjacent the midsole,
wherein two or more of the plurality of segments are at least partially isolated from each other with portions of the midsole therebetween.

* * * * *